(12) United States Patent
Kai et al.

(10) Patent No.: US 12,540,894 B2
(45) Date of Patent: Feb. 3, 2026

(54) POSITION ADJUSTING METHOD, MICROPARTICLE ANALYSIS DEVICE, AND PROGRAM

(71) Applicant: Sony Group Corporation, Tokyo (JP)

(72) Inventors: Shinichi Kai, Tokyo (JP); Junji Kajihara, Tokyo (JP); Koji Kita, Kanagawa (JP); Naohisa Sakamoto, Kanagawa (JP); Kazuya Takahashi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 406 days.

(21) Appl. No.: 17/772,488

(22) PCT Filed: Sep. 11, 2020

(86) PCT No.: PCT/JP2020/034432
§ 371 (c)(1),
(2) Date: Apr. 27, 2022

(87) PCT Pub. No.: WO2021/090574
PCT Pub. Date: May 14, 2021

(65) Prior Publication Data
US 2022/0349806 A1 Nov. 3, 2022

(30) Foreign Application Priority Data
Nov. 6, 2019 (JP) .................. 2019-201577

(51) Int. Cl.
*G01N 15/1434* (2024.01)
*G01N 15/1404* (2024.01)

(52) U.S. Cl.
CPC ..... *G01N 15/1434* (2013.01); *G01N 15/1404* (2013.01); *G01N 2015/1422* (2013.01); *G01N 2015/144* (2013.01)

(58) Field of Classification Search
None
See application file for complete search history.

(56) References Cited

U.S. PATENT DOCUMENTS

| 5,083,014 A | 1/1992 | Kosaka |
| 5,159,403 A | 10/1992 | Kosaka |

(Continued)

FOREIGN PATENT DOCUMENTS

| JP | S62112034 A | 5/1987 |
| JP | H04-081640 A | 3/1992 |

(Continued)

OTHER PUBLICATIONS

International Search Report and English translation thereof mailed Aug. 12, 2020 in connection with International Application No. PCT/JP2020/034432.

(Continued)

*Primary Examiner* — Rufus L Phillips
(74) *Attorney, Agent, or Firm* — Wolf, Greenfield & Sacks, P.C.

(57) ABSTRACT

To provide an adjusting method of a positional relationship between a flow path position and a light irradiation position. The present technology provides a position adjusting method provided with an imaging step of imaging, while moving a flow path through which a microparticle is able to flow in an optical axis direction, the flow path in a plurality of positions in the optical axis direction, a movement step of moving the flow path in the optical axis direction on the basis of a focus index for each of a plurality of images acquired at the imaging step, and an adjustment step of specifying a feature position of the flow path from an image of the flow path in a position after movement at the movement step, and adjusting a positional relationship between (Continued)

the feature position and a reference position in a direction perpendicular to the optical axis direction.

18 Claims, 14 Drawing Sheets

(56) References Cited

U.S. PATENT DOCUMENTS

| | | | | |
|---|---|---|---|---|
| 2010/0315639 | A1* | 12/2010 | Muraki | G01N 15/1484 356/342 |
| 2012/0076349 | A1* | 3/2012 | Manri | G01N 15/1459 382/100 |
| 2013/0308122 | A1* | 11/2013 | Merchez | G01N 21/47 356/72 |
| 2015/0057787 | A1 | 2/2015 | Muraki | |
| 2018/0017769 | A1* | 1/2018 | Meng | G02B 9/16 |
| 2019/0020825 | A1 | 1/2019 | Masuda | |

FOREIGN PATENT DOCUMENTS

| | | |
|---|---|---|
| JP | H04-188042 A | 7/1992 |
| JP | H05-013454 B2 | 2/1993 |
| JP | 2012-127922 A | 7/2012 |
| JP | 2013-210308 A | 10/2013 |
| JP | 5727629 B2 | 6/2015 |
| JP | 2016-191715 A | 11/2016 |
| WO | WO 2012/105966 A1 | 8/2012 |
| WO | WO 2018/067770 A1 | 4/2018 |
| WO | WO-2018175411 A1 | 9/2018 |

OTHER PUBLICATIONS

Santos et al., Evaluation of autofocus functions in molecular cytogenetic analysis. Journal of Microscopy, Oct. 31, 2003. vol. 188 (3), 264-272, 9 pages.

International Written Opinion and English translation thereof mailed Dec. 8, 2020 in connection with International Application No. PCT/JP2020/034432.

International Preliminary Report on Patentability and English translation thereof mailed May 19, 2022 in connection with International Application No. PCT/JP2020/034432.

Extended European Search Report issued Nov. 7, 2022 in connection with European Application No. 20884203.9.

* cited by examiner

A

B

C

POSITION ADJUSTING METHOD, MICROPARTICLE ANALYSIS DEVICE, AND PROGRAM

CROSS-REFERENCE TO RELATED APPLICATIONS

This application claims the benefit under 35 U.S.C. § 371 as a U.S. National Stage Entry of International Application No. PCT/JP2020/034432, filed in the Japanese Patent Office as a Receiving Office on Sep. 11, 2020, which claims priority to Japanese Patent Application Number JP2019-201577, filed in the Japanese Patent Office on Nov. 6, 2019, each of which is hereby incorporated by reference in its entirety.

TECHNICAL FIELD

The present technology relates to a position adjusting method, a microparticle analysis device, and a program, and more specifically, this provides a position adjusting method of a flow path through which a microparticle flows, a microparticle analysis device that executes the position adjusting method, and a program for allowing the microparticle analysis device to execute the position adjusting method.

BACKGROUND ART

Various microparticle sorting devices have been developed so far to sort a microparticle. For example, in a particle sorting system used in a flow cytometer, a laminar flow including a sample liquid including cells and a sheath liquid is discharged from an orifice formed on a flow cell or a microchip. When being discharged, predetermined vibration is applied to the laminar flow to form a droplet. A moving direction of the formed droplet is electrically controlled depending on whether or not this includes a target particle, so that the target particle is sorted.

A technology of sorting the target particle within the microchip without forming the droplet in the above-described manner is also developed. For example, following Patent Document 1 discloses "A microchip comprising: a sample liquid introduction flow path through which a sample liquid including a microparticle flows; at least a pair of sheath liquid introduction flow paths that join the sample liquid introduction flow path from both sides to introduce a sheath liquid around the sample liquid; a joined flow path communicated with the sample liquid introduction flow path and the sheath liquid introduction flow path in which the liquids flowing through the flow paths join to flow; a negative pressure suction unit communicated with the joined flow path to suck to draw in a microparticle being a recovery target; and at least a pair of discharging flow paths provided on both sides of the negative pressure suction unit to be communicated with the joined flow path." (claim 1). In the microchip, the target particle is recovered into the negative pressure suction unit by suction.

CITATION LIST

Patent Document

Patent Document 1: Japanese Patent Application Laid-Open No. 2012-127922

Patent Document 2: Japanese Patent Application Laid-Open No. 2016-191715

SUMMARY OF THE INVENTION

Problems to be Solved by the Invention

In a microparticle sorting operation, a microparticle that flows in a flow path is irradiated with light, and then it is determined whether to sort the microparticle on the basis of light generated by the irradiation. In order to perform such determination more appropriately, it is desirable to irradiate a more appropriate position with light. Therefore, for example, a microparticle is allowed to flow in a flow path, and a position of the flow path or a light irradiation position may be adjusted on the basis of light generated by irradiating the microparticle with light.

Patent Document 2 mentioned above may be cited as an example of a document related to such adjustment. A device disclosed in this document uses detection intensity of light generated by irradiating a microparticle that flows in a flow path with laser for position adjustment of the flow path.

However, the microparticle used for such position adjustment is not a sorting target. In a case where the microparticle is a rare or expensive cell, it is desirable that the number of cells that is not the sorting target is as small as possible. Therefore, an object of the present technology is to reduce the number of microparticles used in adjustment of the positional relationship between the flow path position and the light irradiation position.

Solutions to Problems

The inventors found that the above-described problem may be solved by a specific position adjusting method.

That is, the present technology provides a position adjusting method provided with:
an imaging step of imaging, while moving a flow path through which a microparticle is able to flow in an optical axis direction, the flow path in a plurality of positions in the optical axis direction;
a movement step of moving the flow path in the optical axis direction on the basis of a focus index for each of a plurality of images acquired at the imaging step; and
an adjustment step of specifying a feature position of the flow path from an image of the flow path in a position after movement at the movement step, and adjusting a positional relationship between the feature position and a reference position in a direction perpendicular to the optical axis direction.

The focus index may be an index indicating whether or not the flow path is focused.

The focus index may be a focus index acquired by using an autofocus function.

The autofocus function may be a function based on an image difference.

The autofocus function may be a Brenner function.

The flow path may be used for irradiating a microparticle that flows through the flow path with laser light and analyzing the microparticle on the basis of light generated by the irradiation.

A direction of an optical axis of the laser light may be substantially the same as the optical axis direction at the imaging step.

The movement step may include an image specification step of specifying an image that provides a focus index satisfying a predetermined standard from the plurality of acquired focus indexes, and at the movement step, the flow path may be moved to a position in which the image specified at the image specification step is imaged.

The movement step may include an image specification step of specifying an image that provides a maximum or minimum focus index from the plurality of acquired focus indexes, and at the movement step, the flow path may be moved to a position in which the image specified at the image specification step is imaged.

The feature position may be specified on the basis of a position of a wall that defines the flow path.

The feature position may be a substantially central position in a width direction of the flow path.

The reference position may be an optical axis passing position of laser light with which a microparticle that flows through the flow path is irradiated.

The positional relationship may be a positional relationship in a width direction of the flow path.

At the adjustment step, the flow path may be moved in a width direction of the flow path.

The flow path may be used for irradiating a microparticle that flows through the flow path with laser light and analyzing the microparticle on the basis of light generated by the irradiation, and at the adjustment step, an irradiation position of the laser light may be adjusted. The position adjusting method may further be provided with an additional position adjustment step of irradiating a microparticle that flows through the flow path with laser light and further adjusting the position of the flow path on the basis of light generated by the irradiation.

The microparticle may be a biological particle.

Furthermore, the present technology also provides a microparticle analysis device provided with:

an imaging optical system that images, while moving a flow path through which a microparticle is able to flow in an optical axis direction, the flow path in a plurality of positions in the optical axis direction;

a movement control unit that moves the flow path in the optical axis direction on the basis of a focus index for each of a plurality of images acquired by the imaging optical system; and a positional relationship adjustment unit that adjusts a positional relationship between a feature position specified from an image of the flow path in a position after movement and a reference position in a direction perpendicular to the optical axis direction.

The microparticle analysis device may further be provided with:

an irradiation optical system that irradiates a microparticle that flows through the flow path with laser light; and a light detection system that detects light generated by irradiation of the laser light, in which a direction of an optical axis of the laser light may be substantially the same as the optical axis direction of the imaging optical system. The microparticle analysis device may further be provided with:

an irradiation optical system that irradiates a microparticle that flows through the flow path with laser light; and a light detection system that detects light generated by irradiation of the laser light, in which any one of or both the irradiation optical system and the light detection system may share at least one of optical components included in the imaging optical system.

Furthermore, the present technology also provides a program for allowing a microparticle analysis device to execute:

an imaging step of imaging, while moving a flow path through which a microparticle is able to flow in an optical axis direction, the flow path in a plurality of positions in the optical axis direction;

a movement step of moving the flow path in the optical axis direction on the basis of a focus index for each of a plurality of images acquired at the imaging step; and an adjustment step of specifying a feature position of the flow path from an image of the flow path in a position after movement at the movement step, and adjusting a positional relationship between the feature position and a reference position in a direction perpendicular to the optical axis direction.

MODE FOR CARRYING OUT THE INVENTION

Figure 1:
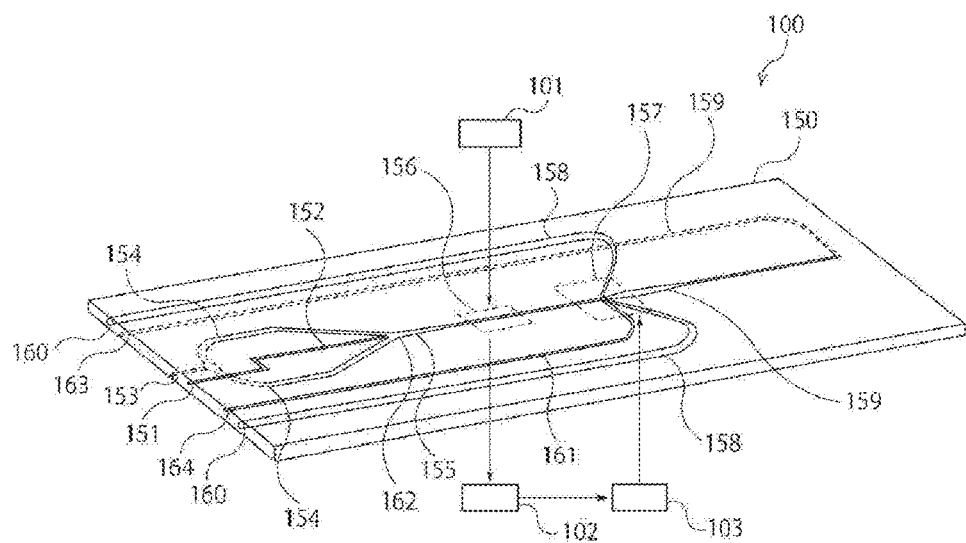
FIG. 1 is a diagram illustrating a configuration example of a microparticle sorting microchip subjected to a position adjusting method of the present technology, and a microparticle analysis device to which the microparticle sorting microchip is attached.

A preferred mode for carrying out the present technology is described below. Note that, embodiments described below are representative embodiments of the present technology, and the scope of the present technology is not limited only to them. Note that, the present technology is described in the following order.

1. First Embodiment (Position Adjusting Method)
   (1) Description of First Embodiment
   (2) Example of Microparticle Sorting Microchip Including Flow Path Subjected to Position Adjusting Method of Present Technology and Example of Microparticle Sorting Operation Using Microparticle Sorting Microchip
      (2-1) Flow Step
      (2-2) Determination Step
      (2-3) Recovery Step
      (2-4) Configuration Example of Optical System
      (2-5) Microparticle Sorting Microchip and Microparticle
   (3) Step Included in Position Adjusting Method of Present Technology
      (3-1) Imaging Step
      (3-2) Movement Step
      (3-3) Adjustment Step
      (3-3-1) Feature Position
      (3-3-2) Reference Position
      (3-3-3) Adjustment of Positional Relationship
      (3-3-4) Advantage of Performing Movement Step before Adjustment Step
   (4) Additional Position Adjustment Step
      (4-1) First Fine Adjustment Step
      (4-2) Second Fine Adjustment Step
   (5) Another Example of Microparticle Analysis Device That Executes Position Adjusting Method of Present Technology
2. Second Embodiment (Microparticle Analysis Device)
3. Third Embodiment (Program)

1. First Embodiment (Position Adjusting Method)

(1) Description of First Embodiment

A position adjusting method of the present technology includes moving a flow path on the basis of a focus index of each of a plurality of flow path images imaged in a plurality of different positions in an optical axis direction, and adjusting a positional relationship between a feature position specified from an image of the flow path in a position after the movement and a reference position. The flow path may be moved to a preferable position by the movement and the adjustment. Moreover, in the movement and the adjustment, it is not required to flow a microparticle in the flow path. Therefore, the number of microparticles used for position adjustment may be reduced.

The position adjusting method of the present technology may be performed, for example, in a device (for example, a device for analyzing and/or sorting a microparticle and the like) that irradiates a microparticle that flows in the flow path with light (for example, laser light), for adjusting a position of the flow path.

The flow path may be used for, for example, irradiating a microparticle that flows through the flow path with laser light, and analyzing the microparticle on the basis of light generated by the irradiation. A direction of an optical axis of the laser light is preferably substantially the same as an optical axis direction at an imaging step included in the position adjusting method of the present technology.

More specifically, the flow path may be, for example, a flow path in a microparticle sorting structure (for example, a flow cell or a microchip) used in a microparticle analysis device (for example, a flow cytometer) that forms a droplet and analyzes and/or sorts a microparticle, or may be a flow path in a microchip used in a microparticle analysis device that analyzes and/or sorts a microparticle in a microchip without forming a droplet. The device in which the position adjusting method of the present technology is executed is not limited thereto. For example, this may also be used in another device that requires adjustment of a positional relationship between a position of a flow path and an irradiation position of light (for example, laser light) to the flow path.

Hereinafter, in (2), the device that analyzes and/or sorts the microparticle in the microchip without forming the droplet is first described, and next, in (3), an example of execution of the position adjusting method of the present technology in the device is described.

Figure 2:
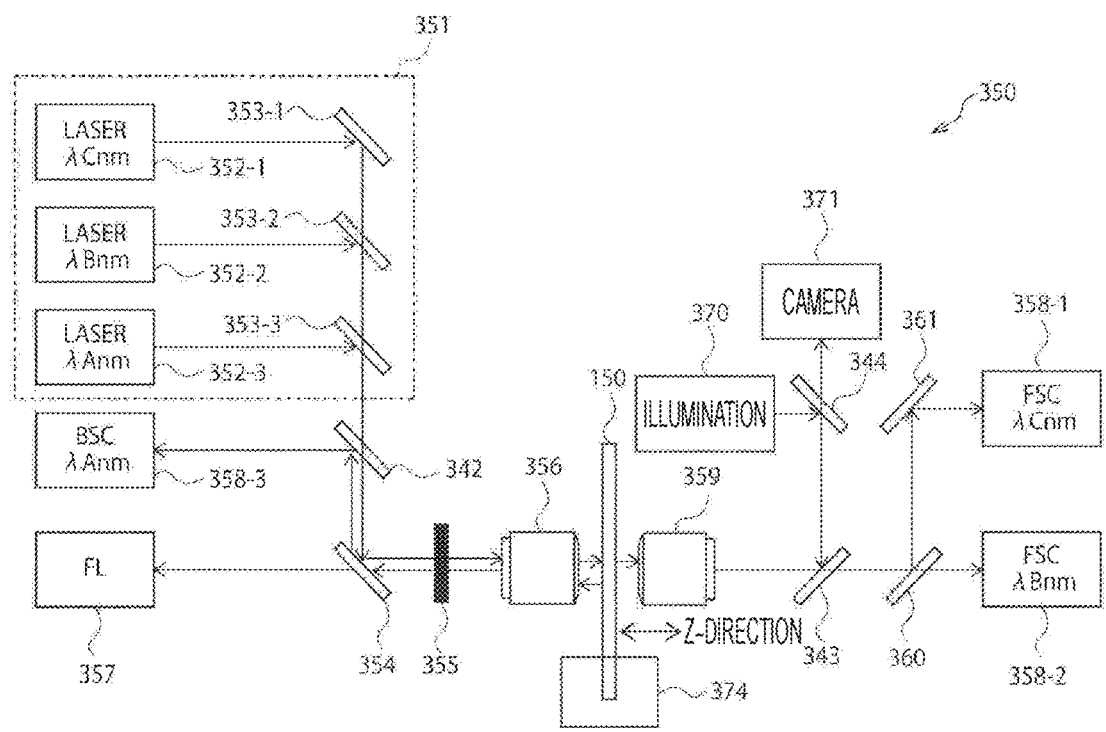
FIG. 2 is a diagram illustrating a configuration example of an optical system of the microparticle analysis device that executes the position adjusting method of the present technology.
Figure 3:
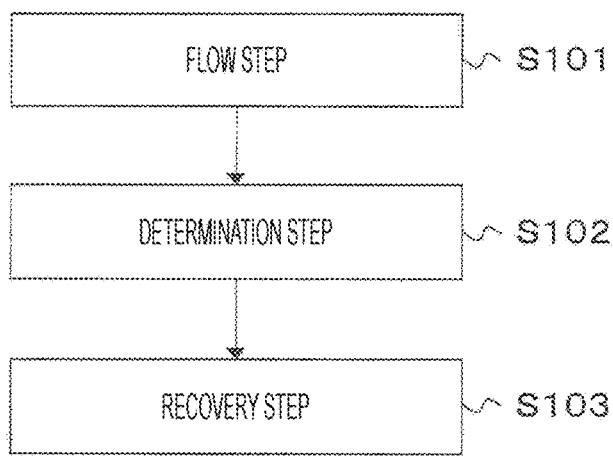
FIG. 3 is an example of a flowchart of a microparticle sorting operation by the microparticle analysis device that executes the position adjusting method of the present technology.

(2) Example of Microparticle Sorting Microchip Including Flow Path Subjected to Position Adjusting Method of Present Technology and Example of Microparticle Sorting Operation Using Microparticle Sorting Microchip FIG. 1 illustrates a schematic diagram of a configuration example of a microparticle sorting microchip including a flow path subjected to a position adjusting method of the present technology, and a configuration example of a microparticle analysis device including the microchip. FIG. 2 illustrates a configuration example of an optical system of the microparticle analysis device. FIG. 3 illustrates an example of a flowchart of a microparticle sorting operation by the microparticle analysis device.

A microparticle sorting microchip 150 illustrated in FIG. 1 includes a sample liquid flow path 152 and a sheath liquid flow path 154 that joins the sample liquid flow path 152 at a junction 162. The microparticle sorting microchip 150 is further provided with a sample liquid inlet 151 and a sheath liquid inlet 153.

Note that, in FIG. 1, a part of the sheath liquid flow path 154 is indicated by a dotted line. The part indicated by the dotted line is located in a position lower than that of the sample liquid flow path 152 indicated by a solid line (position displaced in an optical axis direction to be described later), and the flow paths are not communicated with each other in a position in which the flow path indicated by the dotted line intersect with the flow path indicated by the solid line. Furthermore, in FIG. 1, the sample liquid flow path 152 is illustrated to bend twice between the sample liquid inlet 151 and the junction 162, which facilitates distinction between the sample liquid flow path 152 and the sheath liquid flow path 154. The sample liquid flow path 152 may be formed linearly without bending in this manner between the sample liquid inlet 151 and the junction 162.

In the microparticle sorting operation, a sample liquid including microparticles is introduced from the sample liquid inlet 151 into the sample liquid flow path 152, and a sheath liquid not including the microparticles is introduced from the sheath liquid inlet 153 into the sheath liquid flow path 154.

The microparticle sorting microchip 150 includes a joined flow path 155 including the junction 162 at one end thereof.

The sample liquid and the sheath liquid join at the junction 162, and then flow in the joined flow path 155 toward a particle sort unit 157. Especially, the sample liquid and the sheath liquid join at the junction 162 to form, for example, a laminar flow in which the sample liquid is surrounded by the sheath liquid. Preferably, in the laminar flow, the microparticles are arrayed substantially in a line. Due to a flow path structure in which the sample liquid flow path 152 and two sheath liquid flow paths 154 join at the junction 162, the flow path structure including the joined flow path 155 one end of which is the junction 162, the laminar flow including the microparticles that flow substantially in a line is formed. Therefore, in light irradiation in a detection area 156 to be described below, it becomes easy to distinguish light generated when irradiating one microparticle with light from light generated when irradiating other microparticles with light.

Figure 4:
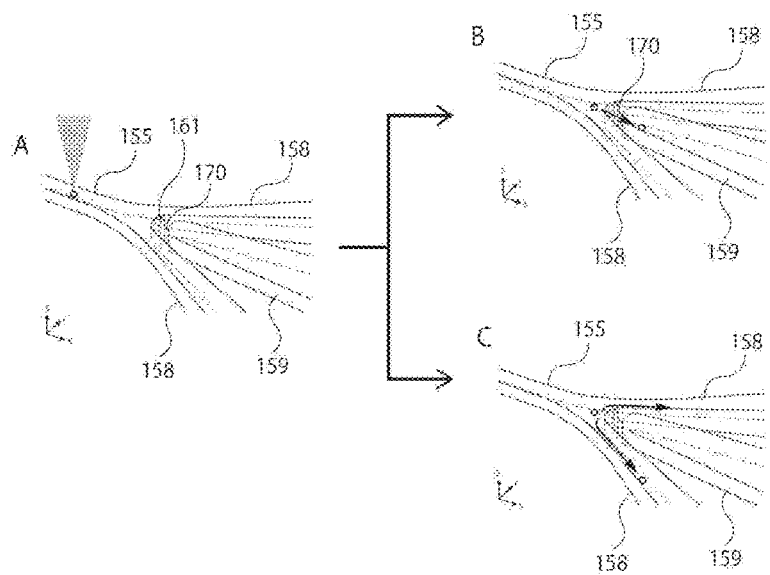
FIG. 4 is a schematic enlarged view of a particle sort unit of the microparticle sorting microchip.

The microparticle sorting microchip 150 further includes the particle sort unit 157 at the other end of the joined flow path 155. FIG. 4 is an enlarged view of the particle sort unit 157. As illustrated in FIG. 4A, at the other end, the joined flow path 155 is connected to a microparticle recovery flow path 159 via a connection flow path 170. As illustrated in FIG. 4A, the joined flow path 155, the connection flow path 170, and the microparticle recovery flow path 159 may be coaxial with each other.

In a case where a recovery target particle flows to the particle sort unit 157, as illustrated in FIG. 4B, a flow from the joined flow path 155 through the connection flow path 170 to enter the microparticle recovery flow path 159 is formed, and the recovery target particle is recovered into the microparticle recovery flow path 159. In this manner, the recovery target particle flows through the connection flow path 170 to the microparticle recovery flow path 159.

In a case where the microparticle that is not the recovery target particle flows to the particle sort unit 157, the microparticle that is not the recovery target particle flows to a branching flow path 158 as illustrated in FIG. 4C. In this case, the flow entering the microparticle recovery flow path 159 is not formed.

As illustrated in FIG. 1, the microparticle recovery flow path 159 is formed so as to extend linearly from the particle sort unit 157, make a U-turn, and then reach the same surface as a surface on which the sample liquid inlet 151 and the sheath liquid inlet 153 are formed. The liquid that flows through the microparticle recovery flow path 159 is discharged out of the chip from a recovery flow path terminal 163.

As illustrated in FIG. 1, the two branching flow paths 158 are also formed so as to extend linearly from the particle sort unit 157, make a U-turn, and then reach the same surface as the surface on which the sample liquid inlet 151 and the sheath liquid inlet 153 are formed. The liquid that flows through the branching flow path 158 is discharged out of the chip from a branching flow path terminal 166.

In FIG. 1, a display method of the microparticle recovery flow path 159 is changed to a solid line and a dotted line at the U-turn. This change indicates that the position in the optical axis direction changes on the way. By changing the position in the optical axis direction in this manner, the microparticle recovery flow path 159 is not communicated with the branching flow path 158 in a portion intersecting with the branching flow path 158.

Both the recovery flow path terminal 163 and two branching flow path terminals 166 are formed on the surface on which the sample liquid inlet 151 and the sheath liquid inlet 153 are formed. Moreover, an introduction flow path inlet 164 for introducing a liquid into an introduction flow path 161 is also formed on the surface. In this manner, in the microparticle sorting microchip 150, all of the inlets from which the liquid is introduced and outlets from which the liquid is discharged are formed on one surface. This facilitates attachment of the chip to a microparticle analysis device 100. For example, as compared with a case where the inlets and/or outlets are formed on two or more surfaces, connection between flow paths provided on the microparticle analysis device 100 and the flow paths of the microparticle sorting microchip 150 becomes easy.

As illustrated in FIGS. 1 and 4, the microparticle sorting microchip 150 includes the introduction flow path 161 for introducing the liquid into the connection flow path 170.

By introducing the liquid from the introduction flow path 161 into the connection flow path 170, the connection flow path 170 is filled with the liquid. This makes it possible to prevent an unintended microparticle from entering the microparticle recovery flow path 159.

The microparticle sorting microchip 150 includes two branching flow paths 158 connected to the joined flow path 155 at the other end of the joined flow path 155. In this manner, in the microparticle sorting microchip used in the present technology, the joined flow path may be branched into the connection flow path and the at least one branching flow path.

The microparticle other than the recovery target particle flows to either of the two branching flow paths 158 without entering the microparticle recovery flow path 159.

Furthermore, as illustrated in FIG. 1, the microparticle sorting microchip 150 forms a part of the microparticle analysis device 100 including a light irradiation unit 101, a detection unit 102, and a control unit 103 in addition to the microchip.

Although not illustrated in FIG. 1, the microparticle analysis device 100 further includes an imaging optical system that images, while moving the flow path through which the microparticle flows in the optical axis direction, the flow path in a plurality of positions in the optical axis direction. A configuration example of the imaging optical system is described in detail in following "(2-4) Configuration Example of Optical System" with reference to FIG. 2. In following "(2-4) Configuration Example of Optical System", the light irradiation unit 101 and the detection unit 102 included in the optical system of the microparticle analysis device 100 are also described.

Figure 5:
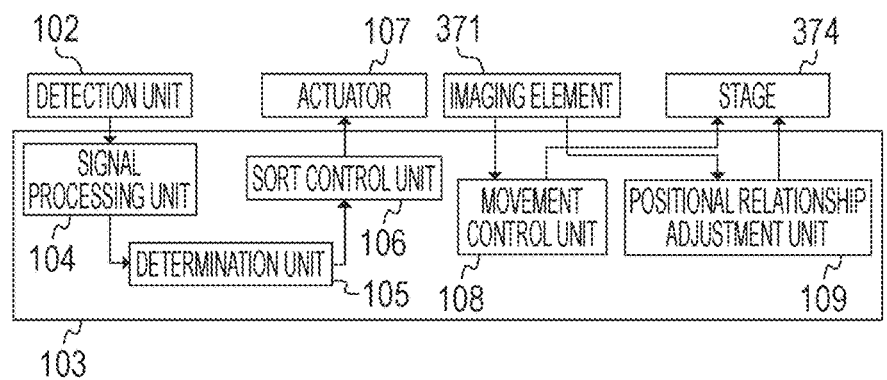
FIG. 5 is a block diagram of an example of a control unit of the microparticle analysis device.

As illustrated in FIG. 5, the control unit 103 of the microparticle analysis device 100 may include a signal processing unit 104, a determination unit 105, and a sort control unit 106. The control unit 103 further includes a movement control unit 108 and a positional relationship adjustment unit 109.

The microparticle sorting operation using the microparticle sorting microchip 150 described above includes, as illustrated in FIG. 3, a flow step S101 of allowing the liquid including the microparticles to flow through the joined flow path 155, a determination step S102 of determining whether or not the microparticle that flows through the joined flow path 155 is the recovery target particle, and a recovery step S103 of recovering the recovery target particle into the microparticle recovery flow path 159.

Each step is described below.

(2-1) Flow Step

At the flow step S101, the sample liquid including the microparticles and the sheath liquid not including the microparticles are introduced from the sample liquid inlet 151 and the sheath liquid inlet 153 into the sample liquid flow path 152 and the sheath liquid flow path 154, respectively.

The sample liquid and the sheath liquid join at the junction 162 to form, for example, the laminar flow in which the sample liquid is surrounded by the sheath liquid. Preferably, in the laminar flow, the microparticles are arrayed substantially in a line. That is, at the flow step S101, the laminar flow including the microparticles that flow substantially in a line may be formed.

In this manner, at the flow step S101, the liquid including the microparticles is allowed to flow in the joined flow path 155, especially as the laminar flow. The liquid flows in the joined flow path 155 from the junction 162 toward the particle sort unit 157.

(2-2) Determination Step

At the determination step S102, it is determined whether or not the microparticle that flows through the joined flow path 155 is the recovery target particle. The determination may be made by the determination unit 105. The determination unit 105 may make the determination on the basis of the light generated by the irradiation of the microparticle with light by the light irradiation unit 101. An example of the determination step S102 is described below in further detail.

At the determination step S102, the light irradiation unit 101 irradiates the microparticle that flows through the joined flow path 155 (especially, the flow path in the detection area 156) in the microparticle sorting microchip 150 with light (for example, excitation light and the like), and the detection unit 102 detects the light generated by the light irradiation. On the basis of a feature of the light detected by the detection unit 102, the determination unit 105 determines whether or not the microparticle is the recovery target particle. For example, the determination unit 105 may make a determination based on scattered light, a determination based on fluorescence, or a determination based on an image (for example, a dark field image or/and a bright field image). At the recovery step S103 described later, the control unit 103 controls the flow in the microparticle sorting microchip 150, so that the recovery target particle is recovered into the microparticle recovery flow path 159.

The light irradiation unit 101 irradiates the microparticle that flows in the flow path in the microparticle sorting microchip 150 with light (for example, excitation light). The light irradiation unit 101 may include a light source that emits light, and an objective lens that condenses the excitation light on the microparticle that flows through the detection area. The light source may be appropriately selected by one skilled in the art depending on a purpose of the analysis, and may be, for example, a laser diode, an SHG laser, a solid-state laser, a gas laser, a high brightness LED, or a halogen lamp, or may be a combination of two or more of them. The light irradiation unit may include other optical elements as needed in addition to the light source and the objective lens.

In one embodiment of the present technology, the detection unit 102 detects scattered light and/or fluorescence generated from the microparticle by the light irradiation by the light irradiation unit 101. The detection unit 102 may include a condensing lens that condenses the fluorescence and/or scattered light generated from the microparticle and a detector. As the detector, a PMT, a photodiode, a CCD, a CMOS and the like may be used, but this is not limited thereto. The detection unit 102 may include other optical elements as needed in addition to the condensing lens and the detector. The detection unit 102 may further include, for example, a spectroscopic unit. Examples of optical components that form the spectroscopic unit may include a grating, a prism, and an optical filter, for example. The spectroscopic unit may detect, for example, light having a wavelength that should be detected separately from light having another wavelength. The detection unit 102 may convert the detected light into an analog electric signal by photoelectric conversion. The detection unit 102 may further convert the analog electric signal into a digital electric signal by AD conversion.

In another embodiment of the present technology, the detection unit 102 may acquire an image generated by the light irradiation by the light irradiation unit 101. The image may be, for example, a dark field image, a bright field image, or both of them. In this embodiment, the light irradiation unit 101 includes, for example, a halogen lamp or a laser, and the detection unit 102 may include a CCD or a CMOS. The detection unit 102 may be, for example, an imaging element obtained by stacking a substrate incorporating a CMOS sensor and a substrate incorporating a digital signal processor (DSP). By allowing the DSP of the imaging element to operate as a machine learning unit, the imaging element may operate as a so-called AI sensor. The detection unit 102 including the imaging element may determine whether or not the microparticle is the recovery target particle, for example, on the basis of a learning model. Furthermore, the learning model may be updated in real time while the method according to the present technology is performed. For example, the DSP may perform machine learning processing during reset of a pixel array unit in the CMOS sensor, exposure of the pixel array unit, or readout of a pixel signal from each unit pixel of the pixel array unit. As an example of the imaging element that operates as the AI sensor, there may be, for example, an imaging device disclosed in International Publication No. 2018/051809.

The signal processing unit 104 included in the control unit 103 may process a waveform of the digital electric signal acquired by the detection unit 102 to generate information (data) regarding the feature of the light used for the determination by the determination unit 105. As the information regarding the feature of the light, the signal processing unit 104 may acquire, for example, one, two, or three of a width of the waveform, a height of the waveform, and an area of the waveform from the waveform of the digital electric signal. Furthermore, the information regarding the feature of the light may include, for example, time when the light is detected. Processing by the signal processing unit 104 described above may be performed especially in the embodiment in which the scattered light and/or fluorescence is detected.

On the basis of the light generated by irradiating the microparticle that flows in the flow path with light, the determination unit 105 included in the control unit 103 determines whether or not the microparticle is the recovery target particle.

In the embodiment in which the scattered light and/or fluorescence is detected, the waveform of the digital electric signal acquired by the detection unit 102 is processed by the control unit 103, and then, on the basis of the information regarding the feature of the light generated by the processing, the determination unit 105 determines whether or not the microparticle is the recovery target particle. For example, in the determination based on the scattered light, a feature of an outer shape and/or an internal structure of the microparticle may be specified, and it may be determined whether or not the microparticle is the recovery target particle on the basis of the feature. Moreover, for example, by performing pretreatment on the microparticle such as a cell in advance, it is possible to determine whether or not the microparticle is the recovery target particle on the basis of the feature similar to that used in flow cytometry. Furthermore, for example, by labeling the microparticle such as the cell with an antibody or dye (especially, a fluorescent dye), it is possible to determine whether or not the microparticle is the recovery target particle on the basis of a feature of a surface antigen of the microparticle.

In the embodiment in which the image is acquired, the determination unit 105 included in the control unit 103 determines whether or not the microparticle is the recovery target particle on the basis of the acquired image (for example, the dark field image, bright field image, or both of them). For example, it may be determined whether or not the microparticle is the recovery target particle on the basis of one or a combination of two or more of a form, a size, and a color of the microparticle (especially, the cell).

The determination may be made, for example, by whether or not the information regarding the feature of the light meets a standard designated in advance. The standard may be a standard indicating that the microparticle is the recovery target particle. The standard may be appropriately set by one skilled in the art, and may be the standard regarding the feature of the light such as the standard used in the technical field of the flow cytometry and the like, for example.

One position in the detection area 156 may be irradiated with one light, or each of a plurality of positions in the detection area 156 may be irradiated with light. For example, the microchip 150 may be formed so that each of two different positions in the detection area 156 is irradiated with light (that is, there are two positions irradiated with the light in the detection area 156). In this case, for example, it may be determined, on the basis of the light (for example, fluorescence and/or scattered light) generated by irradiating the microparticle in one position with light, whether or not the microparticle is the recovery target particle. Moreover, a speed of the microparticle in the flow path may be calculated on the basis of a difference between detection time of the light generated by the light irradiation in the one position and detection time of the light generated by the light irradiation in another position. For this calculation, a distance between the two irradiation positions may be determined in advance, and the speed of the microparticle may be determined on the basis of the difference between the two detection times and the distance. Moreover, on the basis of the speed, arrival time at the particle sort unit 157 described below may be accurately predicted. By accurately predicting the arrival time, it is possible to optimize a timing of forming the flow entering the microparticle recovery flow path 159. Furthermore, in a case where a difference between the arrival time of a certain microparticle at the particle sort unit 157 and the arrival time of the microparticle before or after the certain microparticle at the particle sort unit 157 is equal to or smaller than a predetermined threshold, it is also possible to determine that the certain microparticle is not recovered. In a case where the distance between the certain microparticle and the microparticle before or after the same is short, a possibility that, when the certain microparticle is sucked, the microparticle before or after the same is recovered together increases. By determining that the certain microparticle is not recovered in a case where the possibility that the microparticle is recovered together is high, it is possible to prevent the microparticle before or after the same from being recovered. This makes it possible to increase purity of the target microparticles among the recovered microparticles. Specific examples of the microchip in which each of two different positions in the detection area 156 is irradiated with light and the device including the microchip are disclosed in, for example, Japanese Patent Application Laid-Open No. 2014-202573.

Note that, the control unit 103 may control the light irradiation by the light irradiation unit 101 and/or the light detection by the detection unit 102. Furthermore, the control unit 103 may control drive of a pump for supplying a fluid into the microparticle sorting microchip 150. The control unit 103 may include, for example, a hard disk in which a program for allowing the microparticle analysis device 100 to execute the position adjusting method according to the present technology and an OS are stored, a CPU, and a memory. For example, a function of the control unit 103 may be implemented in a general-purpose computer. The program may be recorded on a recording medium such as a microSD memory card, an SD memory card, or a flash memory, for example. The program recorded on the recording medium may be read out by a drive (not illustrated) provided in the microparticle analysis device 100, and then the control unit 103 may allow the microparticle analysis device 100 to execute the position adjusting method according to the present technology and the microparticle sorting operation performed thereafter according to the read out program.

(2-3) Recovery Step

At the recovery step S103, the microparticle determined to be the recovery target particle at the determination step S102 is recovered into the microparticle recovery flow path 159. The recovery step S103 is performed in the particle sort unit 157 in the microchip 150. In the particle sort unit 157, the laminar flow that flows through the joined flow path 155 separately flows to the two branching flow paths 158. The particle sort unit 157 illustrated in FIG. 1 includes the two branching flow paths 158, but the number of the branching flow paths is not limited to two. The particle sort unit 157 may be provided with, for example, one or a plurality of (for example, two, three, or four) branching flow paths. The branching flow path may be formed to branch into a Y shape on one plane as illustrated in FIG. 1, or may be formed to branch three-dimensionally.

Figure 6A:
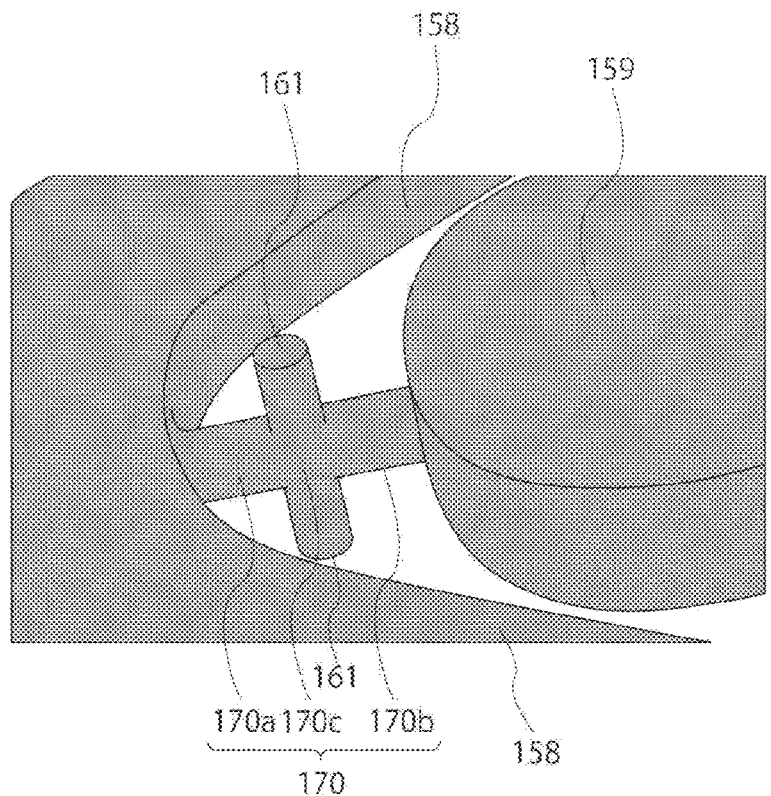
FIG. 6A is an enlarged view of a connection flow path portion.
Figure 6B:
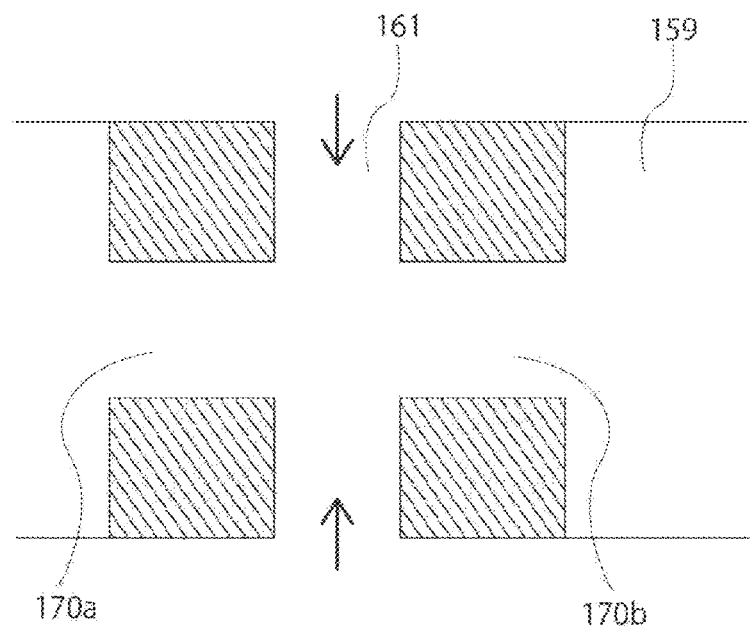
FIG. 6B is an enlarged view of a connection flow path portion.

FIGS. 6A and 6B are enlarged views of the vicinity of the connection flow path 170. FIG. 6A is a schematic perspective view of the vicinity of the connection flow path 170. FIG. 6B is a schematic cross-sectional view on a plane passing through a center line of the introduction flow path 161 and a center line of the connection flow path 170. The connection flow path 170 includes a flow path 170a on a side of the detection area 156 (hereinafter, also referred to as an upstream side connection flow path 170a), a flow path 170b on a side of the microparticle recovery flow path 159 (hereinafter, also referred to as a downstream side connection flow path 170b), and a connection 170c between the connection flow path 170 and the introduction flow path 161. The introduction flow path 161 is provided so as to be substantially perpendicular to an axis of the flow path of the connection flow path 170. In FIGS. 6A and 6B, two introduction flow paths 161 are provided so as to face each other in substantially the central position of the connection flow path 170, but it is also possible that only one introduction flow path is provided.

A shape and a dimension of a cross-section of the upstream side connection flow path 170a may be the same as a shape and a dimension of the downstream side connection flow path 170b. For example, as illustrated in FIGS. 6A and 6B, both the cross-section of the upstream side connection flow path 170a and the cross-section of the downstream side connection flow path 170b may be substantially circular with the same dimension. Alternatively, both the two cross-sections may be rectangles (for example, squares or rectangles) having the same dimension.

The liquid is supplied from the two introduction flow paths 161 to the connection flow path 170 as indicated by arrows in FIG. 6B. The liquid flows from the connection 170c to both the upstream side connection flow path 170a and the downstream side connection flow path 170b.

In a case where the recovery step is not performed, the liquid flows as follows.

The liquid that flows to the upstream side connection flow path 170a exits from a connection surface to the joined flow path 155 of the connection flow path 170, and then flows separately to the two branching flow paths 158. Since the liquid exits from the connection surface in this manner, it is possible to prevent the liquid and the microparticle that do not need to be recovered into the microparticle recovery flow path 159 from entering the microparticle recovery flow path 159 through the connection flow path 170.

The liquid that flows to the downstream side connection flow path 170b flows into the microparticle recovery flow path 159. Therefore, the microparticle recovery flow path 159 is filled with the liquid.

Also in a case where the recovery step is performed, the liquid may be supplied from the two introduction flow paths 161 to the connection flow path 170. However, due to pressure fluctuation in the microparticle recovery flow path 159, especially, by generating a negative pressure in the microparticle recovery flow path 159, a flow from the joined flow path 155 through the connection flow path 170 to the microparticle recovery flow path 159 is formed. That is, a flow is formed from the joined flow path 155 through the upstream side connection flow path 170a, the connection 170c, and the downstream side connection flow path 170b in this order to the microparticle recovery flow path 159. Therefore, the recovery target particle is recovered into the microparticle recovery flow path 159.

Figure 7A:
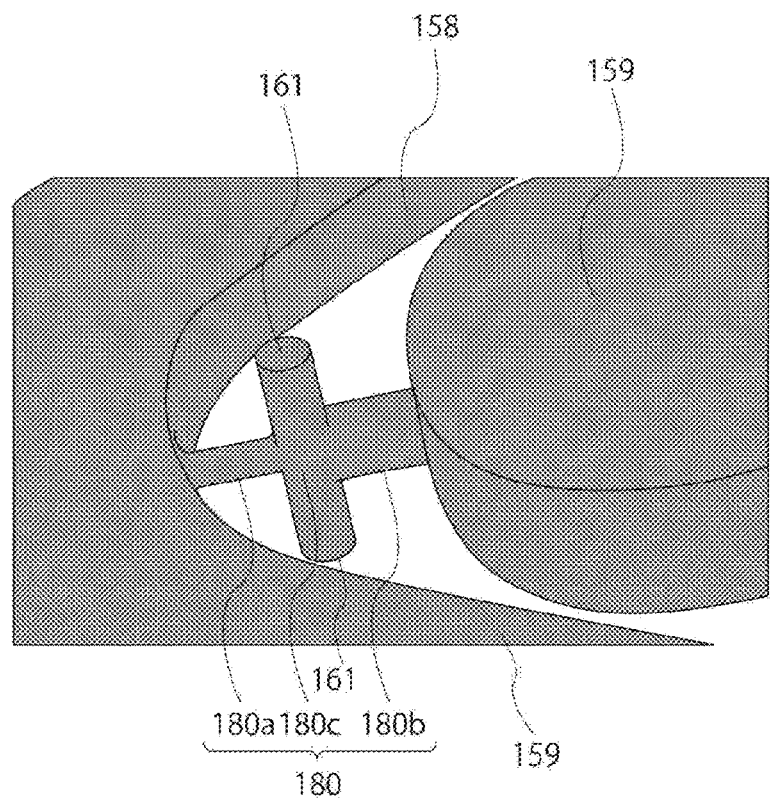
FIG. 7A is an enlarged view of a connection flow path portion.
Figure 7B:
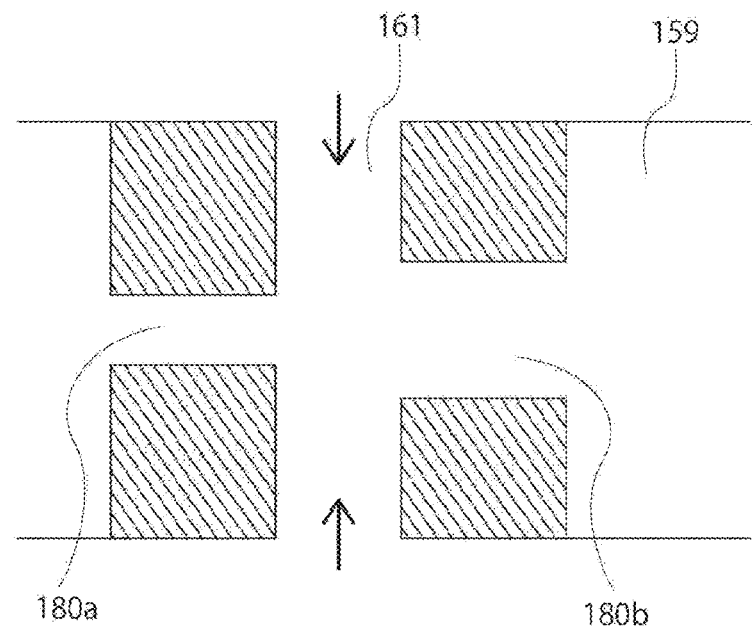
FIG. 7B is an enlarged view of a connection flow path portion.

The shape and/or dimension of the cross-section of the upstream side connection flow path 120a may be different from the shape and/or dimension of the downstream side connection flow path 120b. Examples in which the dimensions of the two flow paths are different from each other are illustrated in FIGS. 7A and 7B. As illustrated in FIGS. 7A and 7B, a connection flow path 180 includes a flow path 180a on a side of the detection area 156 (hereinafter, also referred to as an upstream side connection flow path 180a), a flow path 180b on a side of the microparticle recovery flow path 159 (hereinafter, also referred to as a downstream side connection flow path 180b), and a connection 180c between the connection flow path 180 and the introduction flow path 161. Both a cross-section of the upstream side connection flow path 180a and a cross-section of the downstream side connection flow path 180b have substantially circular shapes, but a diameter of the cross-section of the latter is larger than a diameter of the cross-section of the former. By making the diameter of the cross-section of the latter larger than that of the former, as compared with a case where the diameters of both are the same, it is possible to more effectively prevent the recovery target particle already sorted into the microparticle recovery flow path 159 from being emitted to the joined flow path 155 through the connection flow path 180 immediately after the microparticle sorting operation by the negative pressure described above.

For example, in a case where both the cross-section of the upstream side connection flow path 180a and the cross-section of the downstream side connection flow path 180b are rectangular, by making an area of the cross-section of the latter larger than an area of the cross-section of the former, it is possible to more effectively prevent the already recovered microparticle from being emitted to the joined flow path 155 through the connection flow path 180 as described above.

At the recovery step S103, due to the pressure fluctuation in the microparticle recovery flow path 159, the recovery target particle is recovered into the microparticle recovery flow path through the connection flow path. The recovery may be performed, for example, by generating the negative pressure in the microparticle recovery flow path 159 as described above. The negative pressure may be generated, for example, when a wall that defines the microparticle recovery flow path 159 is deformed by an actuator 107 (especially, a piezo actuator) attached to an outer side of the microchip 150. The negative pressure may form the flow entering the microparticle recovery flow path 159. In order to generate the negative pressure, the actuator 107 may be attached to the outer side of the microchip 150, for example, so that the wall of the microparticle recovery flow path 159 may be deformed. Due to the deformation of the wall, an inner space of the microparticle recovery flow path 159 is changed, and the negative pressure may be generated. The actuator 107 may be, for example, the piezo actuator. When the recovery target particle is sucked into the microparticle recovery flow path 159, the sample liquid that forms the laminar flow or the sample liquid and the sheath liquid that form the laminar flow may also flow to the microparticle recovery flow path 159. In this manner, the recovery target particle is sorted in the particle sort unit 157 and recovered into the microparticle recovery flow path 159.

The connection flow path 170 is provided with the introduction flow path 161 in order to prevent the microparticle that is not the recovery target particle from entering the microparticle recovery flow path 159 through the connection flow path 170. The liquid is introduced into the connection flow path 170 from the introduction flow path 161. By the introduction of the liquid, the connection flow path 170 is filled with the liquid. Moreover, since a flow from the connection flow path 170 to the joined flow path 155 is formed by a part of the liquid, it is possible to prevent the microparticle other than the recovery target particle from entering the microparticle recovery flow path 159. The liquid that forms the flow from the connection flow path 170 to the joined flow path 155 flows, by the flow of the liquid that flows through the joined flow path 155 to the branching flow path 158, through the branching flow path 158 in a manner similar to the liquid without flowing in the joined flow path 155.

Note that, the rest of the liquid introduced into the connection flow path 170 flows to the microparticle recovery flow path 159. Therefore, the microparticle recovery flow path 159 may be filled with the liquid.

The flow that flows to the branching flow path 158 may be discharged out of the microchip at the branching flow path terminal 160. Furthermore, the recovery target particle recovered into the microparticle recovery flow path 159 may be discharged out of the microchip at the recovery flow path terminal 163. A container may be connected to the recovery flow path terminal 163 via a flow path such as a tube. The recovery target particle may be recovered into the container.

As illustrated in FIGS. 1 and 4, in the microparticle sorting microchip used in the present technology, the joined flow path, the connection flow path, and the recovery flow path may be linearly arranged. In a case where these three flow paths are arranged linearly (especially, coaxially), it is possible to more efficiently perform the recovery step as compared with a case where the connection flow path and the recovery flow path are arranged at an angle with respect to the joined flow path, for example. For example, a suction amount required for guiding the recovery target particle to the connection flow path may be further reduced.

Furthermore, in the microparticle sorting microchip, the microparticles are arrayed substantially in a line in the joined flow path and flow toward the connection flow path. Therefore, the suction amount at the recovery step may be reduced.

As described above, in the microparticle sorting microchip, the liquid is supplied from the introduction flow path to the connection flow path. Therefore, a flow from a connection position between the introduction flow path and the connection flow path toward the joined flow path is formed in the connection flow path, and it is possible to prevent the liquid that flows through the joined flow path from entering the connection flow path and prevent the microparticle other than the recovery target particle from flowing to the recovery flow path through the connection flow path. When performing the recovery step, as described above, for example, due to the negative pressure generated in the recovery flow path, the recovery target particle is recovered into the recovery flow path through the connection flow path.

(2-4) Configuration Example of Optical System

A configuration example of an optical system forming the light irradiation unit 101 and the detection unit 102 described above is described with reference to FIG. 2.

An optical system 350 illustrated in FIG. 2 includes a laser light generation unit 351 that generates laser light with which the detection area 156 is irradiated. The laser light generation unit 351 includes, for example, laser light sources 352-1, 352-2, and 352-3, and includes a mirror group 353-1, 353-2, and 353-3 that combines beams of the laser light emitted from these laser light sources.

The laser light sources 352-1, 352-2, and 352-3 emit the beams of the laser light having different wavelengths.

The laser light source 352-1 emits the laser light having a wavelength of, for example, 550 nm to 800 nm (for example, a wavelength of 637 nm). The mirror 353-1 has an optical characteristic of reflecting this laser light.

The laser light source 352-2 emits the laser light having a wavelength of, for example, 450 nm to 550 nm (for example, a wavelength of 488 nm). The mirror 353-2 has an optical characteristic of reflecting this laser light and transmitting the laser light emitted from laser light source 352-1.

The laser light source 352-3 emits the laser light having a wavelength of, for example, 380 nm to 450 nm (for example, a wavelength of 405 nm). The mirror 353-3 has an optical characteristic of reflecting this laser light and transmitting two beams of laser light emitted from the laser light sources 352-1 and 352-2.

By arranging the three laser light sources and the three mirrors as illustrated in FIG. 2, the beams of the laser light with which the microparticle is irradiated are combined.

The combined laser light passes through a mirror 342, is reflected by a mirror 354, then passes through a shutter 355, and enters an objective lens 356. The laser light is condensed by the objective lens 356 and reaches the detection area 156 of the microchip 150.

The microparticle that flows through the detection area 156 is irradiated with the laser light, and fluorescence and scattered light are generated.

In this manner, in the optical system illustrated in FIG. 2, the laser light generation unit 351, the mirrors 352 and 354, and the objective lens 356 are included as components of the light irradiation unit 101. In this manner, the light irradiation unit used in the present technology may include the laser light generation unit, especially the laser light generation unit that generates the laser light obtained by combining a plurality of beams of the laser light. Furthermore, the light irradiation unit used in the present technology may include, for example, the objective lens in addition to the laser light generation unit. The light irradiation unit that irradiates the microparticle that flows through the flow path with the laser light in this manner is also referred to as an irradiation optical system in this specification.

The optical system 350 includes a fluorescence detector 357 that detects the fluorescence. The fluorescence is incident on the objective lens 356, and then condensed by the objective lens 356. The fluorescence condensed by the objective lens 356 passes through the shutter 355, passes through the mirror 354, and then is detected by the fluorescence detector 357.

The optical system 350 includes a scattered light detector 358-3 that detects backscattered light out of the scattered light. The backscattered light is incident on the objective lens 356, and then condensed by the objective lens 356. The backscattered light condensed by the objective lens 356 passes through the shutter 355, then is reflected by the mirror 354, then is further reflected by the mirror 342, and then is detected by the scattered light detector 358-3. The scattered light detector 358-3 detects light having the same wavelength as the wavelength of the laser light emitted from the laser light source 352-3 (for example, light having a wavelength of 380 nm to 450 nm).

The optical system 350 also includes scattered light detectors 358-1 and 358-2 that detect forward scattered light out of the scattered light. The forward scattered light is incident on an objective lens 359, and then condensed by the objective lens 359. The forward scattered light condensed by the objective lens 359 passes through a mirror 343, and then is separated into light having the same wavelength as the wavelength of the laser light emitted from the laser light source 352-1 (for example, light having a wavelength of 550 nm to 800 nm) and light having the same wavelength as the wavelength of the laser light emitted from laser light source 352-2 (for example, light having a wavelength of 450 nm to 550 nm) by a mirror 360. The mirror 360 may be, for example, a half mirror, and has an optical characteristic of reflecting the former light and transmitting the latter light.

The former light is reflected by a mirror 361, and then detected by the scattered light detector 358-1.

The latter light is detected by the scattered light detector 358-2.

In this manner, in the optical system illustrated in FIG. 2, the fluorescence detector 357 that detects the fluorescence generated by the irradiation of the laser light, the scattered light detectors 358-1, 358-2, and 358-3 that detect the scattered light generated by the irradiation, the mirror group that transmits or reflects the fluorescence and/or the scattered light, and the objective lenses 356 and 359 are included as the components of the detection unit 102. In this manner, the detection unit used in the present technology may include the fluorescence detector and/or the scattered light detector. The detection unit used in the present technology may include the objective lens through which the fluorescence and/or scattered light passes, in addition to the fluorescence detector and/or the scattered light detector. The detection unit that detects the light generated by the irradiation of the microparticle that flows through the flow path with the laser light in this manner is also referred to as a light detection system in this specification.

The optical system 350 further includes an illumination device 370 and an imaging element 371. The illumination device 370 and the imaging element 371 are included in the imaging optical system that images the flow path at the imaging step. The imaging optical system illustrated in FIG. 2 is a configuration example of a vertical illumination system-imaging optical system. The illumination device 370 emits illumination light necessary for imaging the flow path of the microparticle sorting microchip 150 (especially, the joined flow path 155 in the detection area 156). The illumination light emitted from the illumination device 370 is reflected by a mirror 344 and the mirror 343, then passes through the objective lens 359, and reaches the microparticle sorting microchip 150. The flow path of the microparticle sorting microchip illuminated by the illumination light (especially, the joined flow path 156 in the detection area 156) is imaged by the imaging element 371 via the objective lens 359. That is, the illumination device 370 and the imaging element 371 are configured to image the flow path via the objective lens 359. In this manner, the illumination device 370, the imaging element 371, and the objective lens 359 may form a part of the imaging optical system that images the flow path in a plurality of positions in the optical axis direction. The imaging element 371 may include, for example, a CCD or a CMOS. The illumination device 370 may be, for example, an illumination device used in microscopic observation, and may be appropriately selected by one skilled in the art.

In the present technology, the imaging optical system may be configured to image the flow path via the objective lens through which the forward scattered light passes. Alternatively, the imaging optical system may be configured to image the flow path via the objective lens through which the backscattered light and/or fluorescence passes. Since at least one of the optical components such as the objective lens is shared by the light detection system and the imaging optical system in this manner, the structure of the optical system may be simplified.

Furthermore, in the present technology, the illumination light of the imaging optical system may also be applied to the flow path via the objective lens through which the laser light applied to the flow path passes. Since at least one of the optical components such as the objective lens is shared by the irradiation optical system and the imaging optical system, the structure of the optical system may be simplified.

Sharing of the optical components such as the objective lens is further described below with reference to FIG. 2.

In the optical system 350 illustrated in FIG. 2, the imaging optical system images the flow path via the objective lens 359 through which the forward scattered light detected by the forward scattered light detectors 358-1 and 358-2 passes. That is, the objective lens 359 is shared by the light detection system and the imaging optical system. In this manner, in the present technology, the light detection system may share at least one optical component (for example, the objective lens, the mirror and the like for allowing the imaging element to image the flow path in an enlarged manner) included in the imaging optical system. Therefore, the configuration of the optical system may be simplified. The sharing of the objective lens is especially preferable from the viewpoint of performance and/or robustness of the microparticle analysis device. For example, in a case where the imaging optical system and the light detection system for detecting the light generated by irradiating the microparticle with light use different objective lenses, a deviation might occur between the imaging optical system and a signal detected by the light detection system due to a deviation of one lens, but such deviation hardly occurs because the objective lens is shared.

Furthermore, in a case where the imaging optical system is a transmissive illumination system, the illumination light for imaging by the imaging optical system passes through the objective lens 356 as described later. The objective lens 356 also transmits the combined laser light as described above. In this manner, in the present technology, the irradiation optical system may share at least one optical component (for example, the objective lens through which the laser light with which the microparticle is irradiated passes) included in the imaging optical system. Therefore, the configuration of the optical system may be simplified.

Furthermore, in a case where the imaging optical system is a transmissive illumination system, the illumination light for imaging by the imaging optical system passes through the objective lens 356 as described later. The objective lens 356 also transmits the fluorescence and backscattered light as described above. The objective lens 356 also transmits the combined laser light as described above. In this manner, in the present technology, the irradiation optical system and the light detection system may share at least one optical component (for example, the objective lens through which the laser light with which the microparticle is irradiated passes and the like) included in the imaging optical system. Therefore, the configuration of the optical system may be simplified.

In the present technology, an optical axis direction of the imaging optical system may be substantially the same as an optical axis direction of the irradiation optical system and/or an optical axis direction of the light detection system. This is further described below with reference to FIG. 2.

In the optical system 350 illustrated in FIG. 2, the optical axis direction of the imaging optical system (especially, the optical axis direction of the objective lens 359 for allowing the imaging element 371 to image the flow path in an enlarged manner) is substantially the same as the optical axis direction of the laser light with which the flow path is irradiated. In this manner, in the microparticle analysis device of the present technology, the direction of the optical axis of the laser light with which the microparticle is irradiated may be substantially the same as the optical axis direction of the imaging optical system.

Furthermore, in the optical system 350 illustrated in FIG. 2, the optical axis direction of the imaging optical system (especially, the optical axis direction of the objective lens 359 for allowing the imaging element 371 to image the flow path in an enlarged manner) is substantially the same as the optical axis direction of the objective lens 356 through which the fluorescence and the backscattered light generated by the laser light to the flow path pass. In this manner, in the microparticle analysis device of the present technology, the optical axis direction of the objective lens through which the fluorescence and/or scattered light (especially, the backscattered light) generated by the irradiation of the microparticle with the laser light passes and the optical axis direction of the imaging optical system (especially, the optical axis direction of the objective lens for allowing the imaging device to image the flow path in an enlarged manner out of the imaging optical system) may be substantially the same.

Furthermore, in the optical system 350 illustrated in FIG. 2, the optical axis direction of the imaging optical system (especially, the optical axis direction of the objective lens 359 for allowing the imaging element 371 to image the flow path in an enlarged manner) is substantially the same as the optical axis direction of the objective lens 359 through which the forward scattered light generated by the laser light to the flow path passes. In this manner, in the microparticle analysis device of the present technology, the optical axis direction of the objective lens through which the fluorescence and/or scattered light (especially, the forward scattered light) generated by the irradiation of the microparticle with the laser light passes and the optical axis direction of the imaging optical system (especially, the optical axis direction of the objective lens for allowing the imaging device to image the flow path in an enlarger manner out of the imaging optical system) may be substantially the same.

In a case where the detection area 156 is imaged by the imaging element 371, the shutter 355 may be closed. Therefore, it is possible to prevent light caused by the mirrors 352 and 354, the fluorescence detector 357, the scattered light detector 358-3, the laser light generation unit 351 and the like from affecting the imaging.

As illustrated in FIG. 2, the illumination device 370 and the imaging element 371 may be configured to acquire the image of the flow path by, for example, the vertical illumination system, especially, a coaxial vertical illumination system.

In the present technology, other illumination systems may also be used as long as the image of the flow path may be acquired; for example, the transmissive illumination system or a side illumination system may be adopted, and the transmissive illumination system may especially be adopted.

In a case where the transmissive illumination system is adopted, for example, the laser light combined by the laser light generation unit 351 may be used as the illumination light. In order to use the laser light as the illumination light, for example, a diffusion plate that diffuses the laser light may be provided on an optical path of the illumination light. The diffusion plate may be arranged, for example, between the mirror 354 and the objective lens 356. The diffusion plate may be movable so as to be arranged on the optical path only in a case where the imaging by the imaging optical system is performed.

Furthermore, in a case where the transmissive illumination system is adopted, a combination of an illumination light source and an optical fiber connected to the illumination light source may be used. Light emitted from the optical fiber may be used as the illumination light. For example, the optical fiber may be arranged so that the light emitted from the optical fiber reaches the microparticle sorting microchip 150 through at least a part of an optical path of the fluorescence detected by the fluorescence detector 357.

The microparticle sorting microchip 150 may be attached to a stage 374 capable of moving the microchip in the optical axis direction of the objective lens 359. Movement of the stage 374 in the optical axis direction may be controlled by the control unit 103, for example. In this manner, the stage 374 may form a part of the imaging optical system.

(2-5) Microparticle Sorting Microchip and Microparticle

In the present technology, "micro" means that at least a part of the flow paths included in the microparticle sorting microchip has a dimension of μm order, especially, a cross-sectional dimension of μm order. That is, in the present technology, the "microchip" refers to a chip including the flow path of μm order, especially, a chip including the flow path having the cross-sectional dimension of μm order. For example, a chip including a particle sort unit including the flow path having the cross-sectional dimension of μm order may be referred to as the microchip according to the present technology. For example, in the particle sort unit 157, a cross-section of the joined flow path 155 is, for example, a rectangle, and a width of the joined flow path 155 is, for example, 100 μm to 500 μm, and especially 100 μm to 300 μm in the particle sort unit 157. A width of the branching flow path that branches from the joined flow path 155 may be smaller than the width of the joined flow path 155. The cross-section of the connection flow path 170 is, for example, circular, and a diameter of the connection flow path 170 at the connection between the connection flow path 170 and the joined flow path 155 may be, for example, 10 μm to 60 μm, and especially 20 μm to 50 μm. These dimensions regarding the flow path may be appropriately changed depending on a size of the microparticle, especially, the size of the recovery target particle.

The microparticle sorting microchip 150 may be manufactured by a method known in the art. For example, the biological particle sorting microchip 150 may be manufactured by adhering two or more substrates on which a predetermined flow path is formed. The flow path may be formed on, for example, all of the two or more substrates (especially, the two substrates), or formed on only a part of the two or more substrates (especially, one of the two substrates). In order to more easily adjust a position when the substrates are adhered, it is preferable that the flow path is formed on only one substrate. For example, it is possible to create the flow path structure in which the two flow paths are provided in different positions in the optical axis direction (so as not to be communicated with each other) and so as to intersect with each other in a case of being seen in the optical axis direction as indicated by the dotted line and the solid line in FIG. 1 by stacking three or more substrates on which the flow path is provided.

Materials known in the art may be used as a material for forming the microparticle sorting microchip 150. Examples thereof include, but are not limited to, for example, polycarbonate, cycloolefin polymer, polypropylene, polydimethylsiloxane (PDMS), polymethylmethacrylate (PMMA), polyethylene, polystyrene, glass, and silicon. Especially, polymer materials such as polycarbonate, cycloolefin polymer, and polypropylene, for example, are especially preferable because they are excellent in processability and it is possible to manufacture a microchip inexpensively using a molding device.

The microparticle sorting microchip 150 is preferably transparent. For example, in the microparticle sorting microchip 150, at least a portion through which light (laser light and scattered light) passes is transparent, and for example, the detection area may be transparent. An entire microparticle sorting microchip 150 may be transparent.

Note that, in the description above, the embodiment in which the above-described flow path group is formed in the disposable microparticle sorting microchip 150 is described, but in the present technology, it is also possible that the above-described flow path group is not formed in the microchip 150. For example, the above-described flow path group may be formed in a substrate such as plastic or glass, for example. Furthermore, the above-described flow path group may have a two-dimensional or three-dimensional structure.

In the present technology, the microparticle may be the particle having a dimension capable of flowing in the flow path in the microparticle sorting microchip. In the present technology, the microparticle may be appropriately selected by one skilled in the art. In the present technology, the microparticles may include biological microparticles such as cells, cell aggregations, microorganisms, and liposomes; synthetic microparticles such as gel particles, beads, latex particles, polymer particles, and industrial particles and the like.

The biological microparticles (also referred to as biological particles) may include chromosomes, liposomes, mitochondria, organelles (cell organelles) and the like that form various cells. The cells may include animal cells (such as hemocyte cells) and plant cells. The cells may be, especially, blood cells or tissue cells. The blood cells may be floating cells such as T cells and B cells, for example. The tissue cells may be, for example, adherent cultured cells, adherent cells separated from the tissue or the like. The cell aggregations may include, for example, spheroids and organoids. The microorganisms may include bacteria such as *Escherichia coli*, viruses such as tobacco mosaic virus, fungi such as yeast and the like. Moreover, the biological microparticles may also include biological polymers such as nucleic acids, proteins, and complexes thereof. These biological polymers may be, for example, extracted from the cells or may be included in blood samples or other liquid samples.

The synthetic microparticles may be microparticles including, for example, organic or inorganic polymer materials, metal and the like. The organic polymer materials may include polystyrene, styrene-divinylbenzene, polymethyl methacrylate and the like. The inorganic polymer materials may include glass, silica, a magnetic material and the like. The metal may include gold colloid, aluminum and the like. The synthetic microparticles may be, for example, gel particles or beads, and more especially, gel particles or beads to which one or a combination of two or more selected from oligonucleotides, peptides, proteins, and enzymes are bound.

A shape of the microparticle may be spherical or substantial spherical or non-spherical. A size and mass of the microparticle may be appropriately selected by one skilled in the art depending on a size of the flow path of the microchip. In contrast, the size of the flow path of the microchip may also be appropriately selected depending on the size and mass of the microparticle. In the present technology, a chemical or biological label such as fluorescent dye or fluorescent protein, for example, may be attached to the microparticle as needed. The label may make detection of the microparticle easier. The label that should be attached may be appropriately selected by one skilled in the art. Molecules that specifically react with the microparticles (for example, antibodies, aptamers, DNA, RNA or the like) may bind to the label.

According to one embodiment of the present technology, the microparticle may be the biological particle, especially, the cell.

(3) Step Included in Position Adjusting Method of Present Technology

Figure 8:
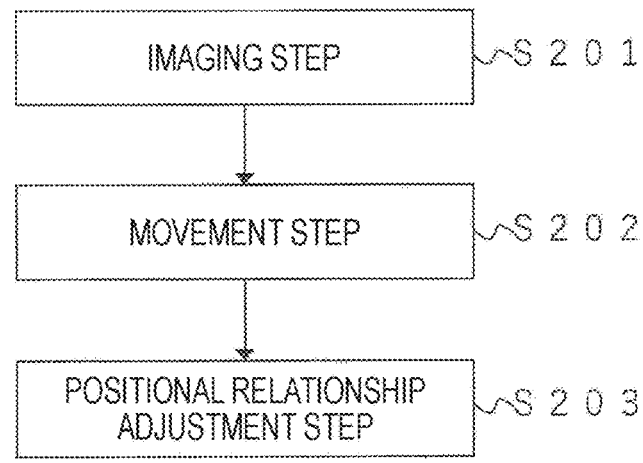
FIG. 8 is an example of a flow chart of the position adjusting method of the present technology.

FIG. 8 illustrates an example of a flow chart of a position adjusting method of the present technology. As illustrated in FIG. 8, the position adjusting method of the present technology includes an imaging step S201, a movement step S202, and a positional relationship adjustment step S203. Each step is described below.

Note that, the flow path subjected to the position adjusting method of the present technology may be filled with a liquid or not (may be empty). As an example of a scene in which the position adjusting method of the present technology is applied to the flow path filled with the liquid, the time of priming processing of the flow path may be mentioned. For example, in a case where the microparticle sorting microchip is used for the first time, in order to prevent bubbles from remaining in the flow path, for example, the chip is subjected to the priming processing for allowing the liquid to flow in the flow path, and then the microparticle sorting operation is performed thereafter. The position adjusting method of the present technology may be performed at the time of priming processing of the flow path. Therefore, since the priming processing and the position adjustment are simultaneously executed, a time required for adjustment processing before the microparticle sorting processing may be shortened.

(3-1) Imaging Step

As illustrated in FIG. 2, the microparticle sorting microchip 150 is attached to the stage 374. The microparticle sorting microchip 150 is attached to the stage 374 so that a flow path portion in the detection area 156 out of the joined flow path 155 of the microparticle sorting microchip 150, especially the flow path portion irradiated with the laser light combined as described above may be imaged by the imaging element 371 via the objective lens 359.

The stage 374 is movable in the optical axis direction (z-axis direction) of the objective lens 359. The optical axis direction may be said to be, for example, a focusing direction of imaging at the imaging step, and may also be said to be the same direction as the direction of the optical axis of the objective lens 359. In FIG. 2, the direction indicated as the z-direction is the optical axis direction.

The optical axis direction at the imaging step is substantially the same as the direction of the optical axis of the laser light with which the detection area 156 of the microparticle sorting microchip 150 is irradiated.

Furthermore, the stage 374 is also movable in a width direction (x-axis direction) of the joined flow path 155 and in an axial direction (y-axis direction) of the joined flow path.

By the movement of the stage 374, the microparticle sorting microchip 150 attached to the stage 374 and the flow path (for example, the joined flow path 155) included in the chip also move.

The stage 374 is recovered to an origin after the microparticle sorting microchip 150 is attached to the stage 374. The origin is a position set in advance with respect to the microparticle analysis device 100. Then, the stage 374 is moved to the origin and thereafter moved to a measurement start point in the optical axis direction.

At the imaging step S201, the stage 374 is moved in the optical axis direction from the measurement start point, so that the joined flow path 155 is also moved. The movement is finished when the stage 374 reaches a measurement end point. The measurement start point and the measurement end point may be appropriately set by one skilled in the art according to the configuration of the microparticle analysis device 100. The movement may be controlled by the control unit 103, and the control unit 103 may move the stage 374 in the optical axis direction.

At the imaging step S201, while the stage 374 is moved in the optical axis direction from the measurement start point to the measurement end point, the imaging element 371 images the flow path portion in a plurality of positions in the optical axis direction.

The stage 374 may be moved in the optical axis direction by, for example, 1 µm to 300 µm, especially 1.5 µm to 200 µm, more especially 2 µm to 150 µm. The flow path portion may be imaged in a position after each movement. That is, an interval between the imaged positions may be within this numerical range.

A plurality of acquired images may be transmitted to the control unit 103 (especially, the movement control unit 108). The plurality of images may be stored in, for example, a storage unit (not illustrated) connected to the imaging element 371, and then, the control unit 103 may acquire the plurality of images stored in the storage unit.

(3-2) Movement Step

The movement control unit 108 calculates a focus index for each of the plurality of images acquired at the imaging step. Therefore, a plurality of focus indexes is acquired. In this specification, the focus index may mean an index indicating whether or not the flow path through which the microparticle may flow is focused.

In a preferred embodiment of the present technology, the focus index is a focus index acquired by using an autofocus function. The movement control unit 108 may acquire the focus index for each of the plurality of images acquired at the imaging step using the autofocus function. The autofocus function may preferably be any of a function based on an image difference, a function based on depths of peaks and valleys in a grey level image, a function based on an image contrast, a function based on a histogram, or a function based on a correlation measure. For example, any one of the functions represented by following expressions (1) to (13) may be used as the autofocus function, and especially preferably any one of following expressions (1) to (3) may be used as the autofocus function. Details of these expressions are described, for example, in A. Santos et al., Evaluation of autofocus functions in molecular cytogenetic analysis, Journal of Microscopy, Vol. 188, Pt 3, December (1997).

Examples of the function based on the image difference may include functions represented by following expressions (1) to (4), for example. Especially preferably, Expression (1): a function based on a gradient absolute value equal to or larger than a threshold

[Mathematical Expression 1]

$$F_{th\_grad} = \sum_M \sum_N |g(i, j+1) - g(i, j)| \quad (1)$$

(wherein, $|g(i,j+1)-g(i,j)| \geq v$).

In expression (1), g(i,j) represents grey level intensity of a pixel (i,j), and v represents a gradient threshold. For example, v may be 0.

Expression (2): a function based on a squared gradient

[Mathematical Expression 2]

$$F_{sq\_grad} = \sum_M \sum_N |g(i, j+1) - g(i, j)|^2 \quad (2)$$

(wherein, $|g(i,j+1)-g(i,j)| \geq v$).

In expression (2), g(i,j) represents the grey level intensity of the pixel (i,j), and v represents the gradient threshold. For example, v may be 0.

Expression (3): Brenner function

[Mathematical Expression 3]

$$F_{brenner} = \sum_M \sum_N |g(i, j+2) - g(i, j)|^2 \quad (3)$$

(wherein, $|g(i,j+2)-g(i,j)| \geq v$).

In expression (3), g(i,j) represents the grey level intensity of the pixel (i,j), and v represents the gradient threshold. For example, v may be 0.

Expression (4): a function based on the gradient absolute value equal to or larger than the threshold

[Mathematical Expression 4]

$$F_{tenengrad} = \sum_M \sum_N T[g(i, j)] \quad (4)$$

$$T[g(i, j)] = G_x^2(i, j) + G_y^2(i, j)$$

In expression (4), T[g(i,j)] represents a square of a gradient value of the pixel (i,j), and $G_x(i,j)$ and $G_y(i,j)$ represent convolution of an image by a Sobel operator.

Examples of the function based on the depths of the peaks and valleys in the grey level image may include functions represented by following expressions (5) to (7), for example.

Expression (5): a function based on an image content equal to or larger than a threshold

[Mathematical Expression 5]

$$F_{th\_cont} = \sum_M \sum_N g(i, j) \quad (5)$$

(wherein, $g(i,j) \geq \Theta$).

In expression (5), $\Theta$ represents a luminance threshold.

Expression (6): a thresholded pixel count function

[Mathematical Expression 6]

$$F_{num\_pix} = \sum_M \sum_N s[g(i, j), \Theta] \quad (6)$$

$$s[x, \Theta] = \begin{cases} 0, x \geq \Theta \\ 1, x < \Theta \end{cases}$$

Expression (7): an image power function

[Mathematical Expression 7]

$$F_{power} = \sum_M \sum_N g(i, j)^2 \quad (7)$$

(wherein, $g(i,j) \geq \Theta$).

Examples of the function based on the image contrast may include functions represented by following expressions (8) and (9), for example.

Expression (8): a function based on deviation

[Mathematical Expression 8]

$$F_{var} = \frac{1}{MN}\sum_{M}\sum_{N}[g(i,j)-\bar{g}]^2 \quad (8)$$

Expression (9): a function based on normalized deviation

[Mathematical Expression 9]

$$F_{nor\_var} = \frac{1}{MN\bar{g}}\sum_{M}\sum_{N}[g(i,j)-\bar{g}]^2 \quad (9)$$

Examples of the function based on the histogram may include functions represented by following expressions (10) to (11), for example.

Expression (10): a function based on a range

[Mathematical Expression 10]

$$F_{range} = \max\{k|H_k>0\} - \min\{k|H_k>0\} \quad (10)$$

(11) a function based on entropy

[Mathematical Expression 11]

$$F_{entropy} = -\sum_{k}p_k \log_2 p_k \quad (11)$$

Examples of the function based on the image contrast may include functions represented by following expressions (12) and (13), for example.

Expression (12): a $F_4$ function of Vollath

[Mathematical Expression 12]

$$F_{voll4} = \sum_{i=1}^{M-1}\sum_{j=1}^{N}g(i,j)\cdot g(i+1,j) - \sum_{i=1}^{M-2}\sum_{j=1}^{N}g(i,j)\cdot g(i+2,j) \quad (12)$$

Expression (13): a $F_5$ function of Vollath

[Mathematical Expression 13]

$$F_{voll5} = \sum_{i=1}^{M-1}\sum_{j=1}^{N}g(i,j)\cdot g(i+1,j) - MN\bar{g}^2 \quad (13)$$

Especially preferably, the autofocus function is the function based on the image difference. The function based on the image difference is preferable from the viewpoint of ease of acquisition of the focus index. Furthermore, the function based on the image difference is also preferable for acquiring a maximum or minimum focus index to be described later. More preferably, the autofocus function is the Brenner function.

At the movement step, the flow path is moved in the optical axis direction (for example, the z-axis direction in FIG. 2) on the basis of the plurality of acquired focus indexes. For example, the movement control unit 108 may move the position of the stage 374 to perform the movement. For example, the movement control unit 108 may specify one image on the basis of the focus index, and then move the flow path to the position in which the image is imaged. The movement of the flow path at the movement step may be the movement by the movement of the stage 374 as is the case with the movement of the flow path at the imaging step.

According to one embodiment of the present technology, the movement step may include an image specification step of specifying an image that provides a focus index satisfying a predetermined standard out of the plurality of acquired focus indexes. Then, at the movement step, the flow path may be moved to the position in which the image specified at the image specification step is imaged. The image may be specified by, for example, the movement control unit 108. As the predetermined standard, for example, whether the image is the image that provides the maximum or minimum focus index or the image that provides the focus index within a predetermined numerical value range (especially, the focus index of a predetermined value or larger or a predetermined value or smaller) may be adopted.

Figure 9:
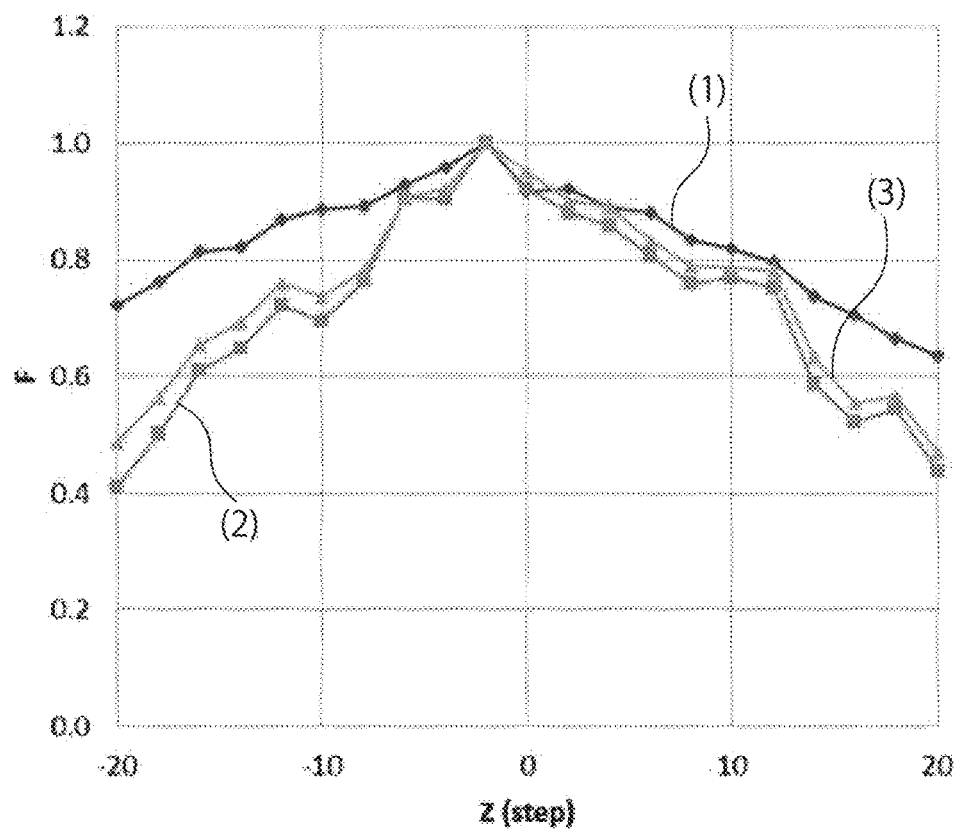
FIG. 9 is a graph illustrating an example of a plot of a focus index with respect to a position in an optical axis direction.

For example, in a case where the value itself acquired by using the autofocus function is adopted as the focus index, the image that provides the maximum focus index or the image that provides the focus index of a predetermined value or larger may be specified at the image specification step. FIG. 9 illustrates an example of a graph in which a plurality of focus indexes is plotted with respect to the position in the optical axis direction. The graph illustrated in FIG. 9 is a plot of the value itself acquired by using the autofocus functions represented by expressions (1) to (3) with respect to the imaging position in the optical axis direction. The value itself is used as the focus index. As illustrated in FIG. 9, a position in which the focus index is maximized may be specified, and the image in the position is specified as the imaging position of the image that provides the maximum focus index.

Figure 10:
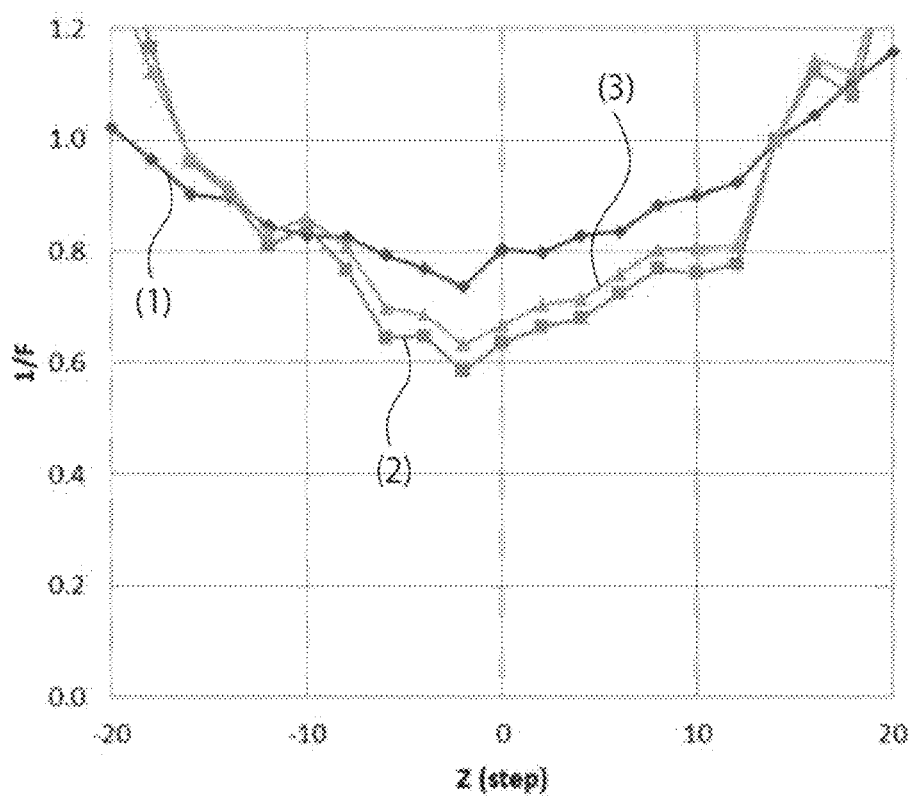
FIG. 10 is a graph illustrating an example of a plot of a focus index with respect to a position in an optical axis direction.

Alternatively, in a case where an inverse of the value acquired by using the autofocus function is adopted as the focus index, the image that provides the minimum focus index or the image that provides the focus index of a predetermined value or smaller may be specified at the image specification step. FIG. 10 illustrates an example of a graph in which a plurality of focus indexes is plotted with respect to the position in the optical axis direction. The graph illustrated in FIG. 10 is a plot of the inverse of the value acquired by using the autofocus functions represented by expressions (1) to (3) with respect to the imaging position in the optical axis direction. The inverse is used as the focus index. As illustrated in FIG. 10, the position in which the focus index is minimized may be specified, and the image in the position is specified as the imaging position of the image that provides the minimum focus index.

Especially preferably, the movement step includes the image specification step of specifying the image that provides the maximum or minimum focus index from the plurality of acquired focus indexes. Then, at the movement step, the flow path may be moved to the position in which the image specified at the image specification step is imaged.

(3-3) Adjustment Step

The positional relationship adjustment unit 109 specifies the feature position of the flow path from the image of the flow path in the position after the movement at the movement step. Then, the positional relationship adjustment unit 109 adjusts a positional relationship between the feature position and the reference position in a direction perpendicular to the optical axis direction. The positional relationship may be, for example, the positional relationship in the width direction of the flow path and/or the axial direction of the flow path, and especially is the positional relationship in the width direction of the flow path.

(3-3-1) Feature Position

The feature position is, for example, a position through which the microparticle allowed to flow in the flow path desirably passes. A more specific example of the feature position is a substantially central position in the width direction of the flow path. The width direction of the flow path is a direction perpendicular to the optical axis direction and perpendicular to the axial direction of the flow path (or a flow direction of the microparticle). For example, with respect to a flow path P illustrated on a left side of FIG. 11, the x-axis direction corresponds to the width direction. In this drawing, the y-axis direction corresponds to the axial direction of the flow path.

The positional relationship adjustment unit 109 may specify the feature position on the basis of, for example, a position of a wall that defines the flow path. The position of the wall may be specified from the image specified at the movement step. The image specified at the movement step is, for example, the image that provides the maximum focus index, and is a preferable image from the viewpoint of adjusting the focus on the flow path. Therefore, the image specified at the movement step is suitable for accurately specifying the position of the wall that defines the flow path.

Positions of two walls in the width direction of the flow path may be used for specifying the feature position. For example, in a case where the cross-section of the flow path is circular or rectangular, a shape of the cross-section of the flow path is symmetrical with respect to the axis of the flow path. Therefore, the center between the positions of the two walls may be specified as the feature position. In this manner, in the present technology, the feature position may be, for example, a substantially central position in the width direction of the flow path.

An example of a manner of specifying the feature position by the positional relationship adjustment unit 109 is described below with reference to FIG. 11.

Figure 11:
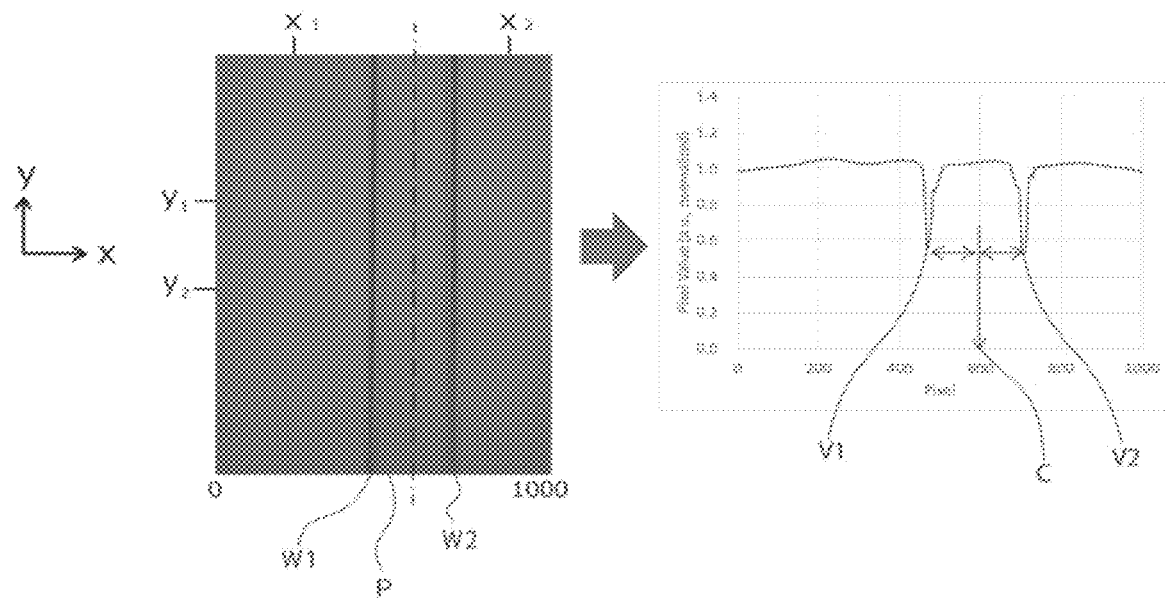
FIG. 11 is a diagram for illustrating an example of a manner of specifying a feature position.

As illustrated in a left image of FIG. 11, two walls W1 and W2 of the flow path P are confirmed.

The positional relationship adjustment unit 109 acquires pixel values in a position $x_1$ in the x-axis direction from a position $y_1$ to a position $y_2$ in the y-axis direction. The positional relationship adjustment unit 109 averages a plurality of acquired pixel values to acquire an average pixel value in the position $x_1$. The positional relationship adjustment unit 109 similarly acquires the average pixel value for other positions in the x-axis direction. The position in the x-axis direction in which the average pixel value is acquired is set so as to cross the walls W1 and W2 in the x-axis direction. For example, the average pixel value in each position from $x_1$ to $x_2$ illustrated in FIG. 11 is acquired.

When the average pixel value in each position from $x_1$ to $x_2$ is plotted with respect to the position in the x-axis direction, a graph as illustrated on a right side of FIG. 11 is acquired. Two valleys may be confirmed in the graph. Positions V1 and V2 in the x-axis direction corresponding to bottoms of these two valleys (positions in the x-axis direction in which the average pixel value is minimized in each valley) correspond to positions of the walls W1 and W2 in the x-axis direction, respectively. The center C between V1 and V2 corresponds to the substantially central position in the width direction of the flow path P.

The positional relationship adjustment unit 109 may specify the substantially central position as the feature position on the basis of the acquired average pixel value. Specifically, for example, the positional relationship adjustment unit 109 specifies the position in the x-axis direction in which the average pixel value is minimized on each of both sides of the axis of the flow path P. The positional relationship adjustment unit 109 may specify the center between the two positions in the x-axis direction thus specified as the feature position.

As described above, the positional relationship adjustment unit 109 may specify the feature position on the basis of the pixel value of the image of the flow path in the position after the movement at the movement step. Preferably, more specifically, the positional relationship adjustment unit 109 may specify the feature position on the basis of the average pixel value (especially, the average pixel value acquired for each position in the x-axis direction (width direction)) of the image of the flow path.

Note that, in place of the average pixel value, a pixel value integrated for each position in the x-axis direction (width direction) may be used, or a pixel value in each position in the x-axis direction (width direction) in a certain point in the y-axis direction may be used.

The image in which the feature position is specified may be a grayscale image or a color image. The pixel value may be a pixel value in the grayscale image or a pixel value in the color image. In a case where the image is the color image, the pixel value may be, for example, a pixel value for any one element out of an R element, a G element, and a B element.

(3-3-2) Reference Position

The reference position may be a position required to coincide with the feature position from the viewpoint of irradiation of the microparticle with light. For example, the reference position is a position through which light with which the microparticle that flows through the flow path is irradiated passes, and especially is an optical axis passing position of laser light with which the microparticle that flows through the flow path is irradiated, for example. The reference position may be determined in advance according to factors such as a structure of the optical system of the microparticle analysis device and a shape of the laser light, for example.

As for the reference position, for example, a microparticle sorting microchip as a reference may be prepared, a microparticle (such as a bead) may be allowed to flow through the chip to measure a signal of scattered light and/or fluorescence, and a position in which the signals are best may be adopted as the reference position.

Furthermore, since the irradiation position of the laser light may be specified by the imaging optical system, the irradiation position (for example, the central position of the laser light) may be adopted as the reference position.

(3-3-3) Adjustment of Positional Relationship

At the adjustment step, the positional relationship adjustment unit 109 adjusts the positional relationship between the feature position and the reference position, and more preferably adjusts the positional relationship in the width direction of the flow path.

In one embodiment of the present technology, at the adjustment step, the flow path may be moved in the x-axis direction (width direction) of the flow path. Therefore, the positional relationship between the feature position and the reference position in the width direction may be adjusted. For example, the flow path may be moved in the width direction so that the feature position coincides with the reference position. The positional relationship adjustment unit 109 may drive the movement of the stage on which the microparticle sorting microchip including the flow path is held, for example, in order to implement the movement of the flow path, for example.

In another embodiment of the present technology, at the adjustment step, the irradiation position of the laser light may be adjusted. In this embodiment, the flow path may be used, for example, for irradiating the microparticle that flows through the flow path with the laser light and analyzing the microparticle on the basis of the light generated by the irradiation. The positional relationship adjustment unit 109 may adjust, for example, a position or a direction of the optical component forming the optical system for the irradiation of the laser light in order to implement the adjustment of the irradiation position, for example.

(3-3-4) Advantage of Performing Movement Step before Adjustment Step

An advantage of performing the movement step before the adjustment step is described below with reference to FIG. 18.

Figure 18:
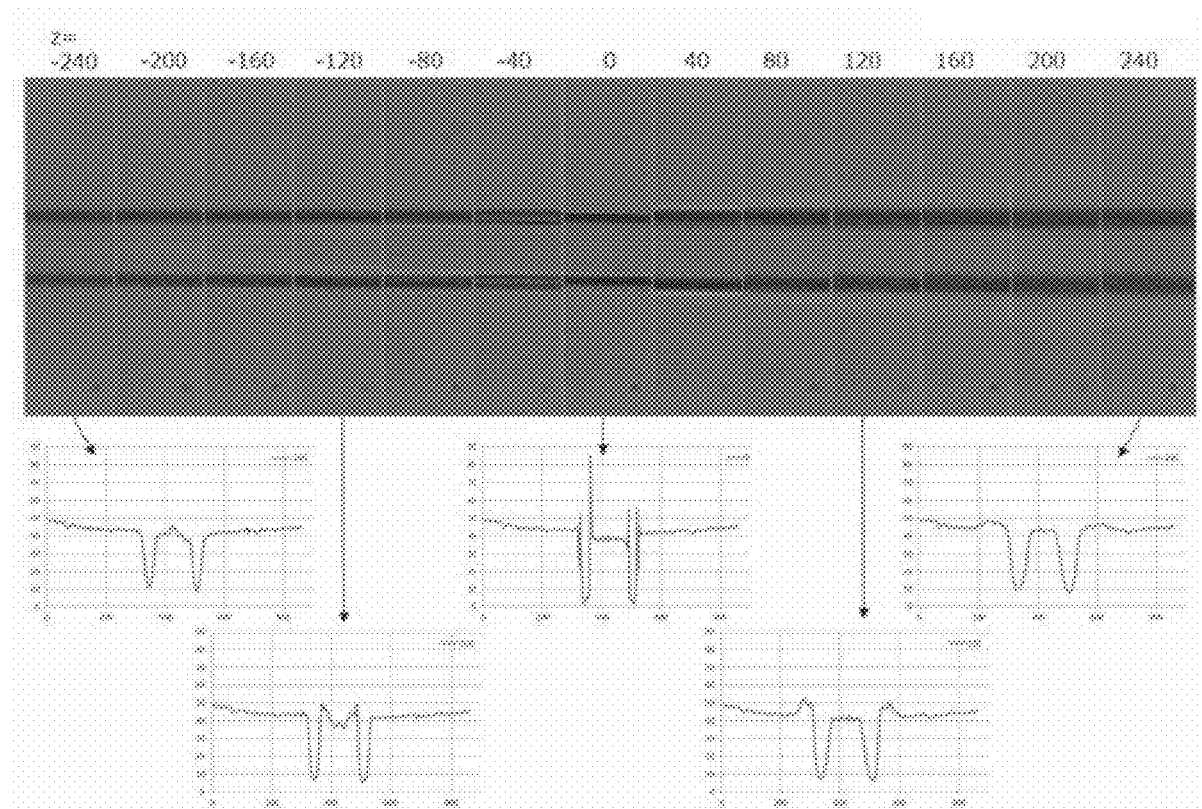
FIG. 18 is a diagram illustrating images of a flow path in a plurality of positions in a z-axis direction and a plot of an average pixel value with respect to a position in an x-axis direction.

In an upper part of FIG. 18, images acquired by imaging the flow path by the imaging optical system while moving the flow path in the z-axis direction are illustrated. Above these images, z represents the number of steps of the movement; that is, these images are the images of the flow path in positions after the movement by 40 steps, 80 steps, 120 steps, 160 steps, 200 steps, and 240 steps, and by −40 steps, −80 steps, −120 steps, −160 steps, −200 steps, and −240 steps in the z-axis direction with a certain position on the z-axis as 0. One step is set to about 2.5 µm. Among these images, the image in the position 0 is the most focused image.

Plots illustrated in a lower part of FIG. 18 are plots of the average pixel value with respect to the position in the x-axis direction created as described with reference to FIG. 11 in "(3-3-1) Feature Position" described above from the image in each of the positions in which z is −240 step, −120 step, 0, 120 step, and −240 step. As may be seen from these plots, in a case where z=0, that is, in the most focused image, the valley of the average pixel value is the sharpest. Therefore, in a case of z=0, the position in which the average pixel value is the minimum in these valleys is most easily specified. In this manner, by performing the movement step, the feature position may be easily specified at the adjustment step.

(4) Additional Position Adjustment Step

Figure 17:
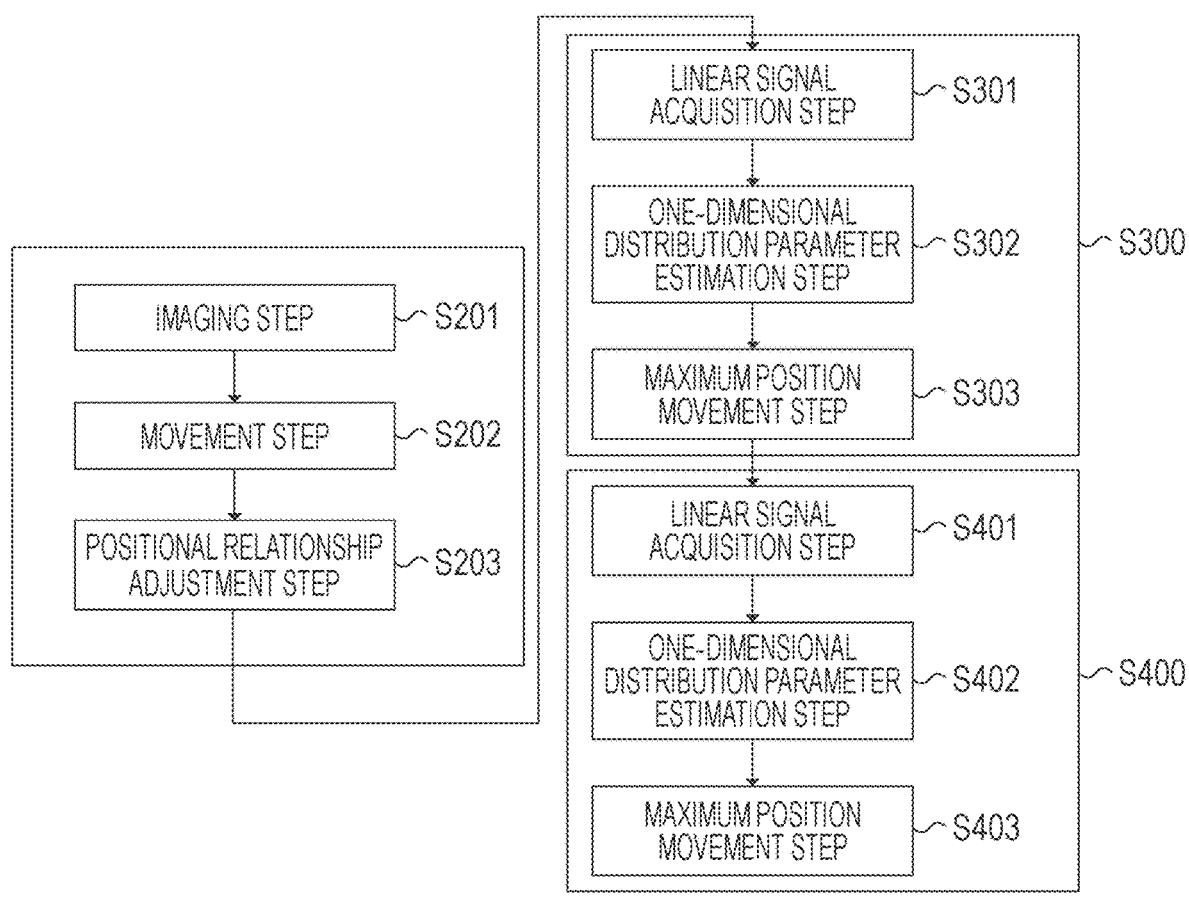
FIG. 17 is an example of a flow chart of the position adjusting method of the present technology including the additional position adjustment step.

The position adjusting method of the present technology may further include an additional position adjustment step of irradiating the microparticle (for example, a bead and the like) that flows through the flow path with laser light and further adjusting the position of the flow path on the basis of light generated by the irradiation. The additional position adjustment step is performed after the adjustment step described in "(3-3) Adjustment Step" described above. By performing the additional position adjustment step, the position of the flow path may be moved to a more appropriate position. FIG. 17 illustrates an example of a flow chart of the position adjusting method of the present technology including the additional position adjustment step.

In FIG. 17, the imaging step S201, the movement step S202, and the positional relationship adjustment step S203 are as described in (3) described above, the description thereof is omitted. After the positional relationship adjustment step S203, the additional position adjustment step is performed. As illustrated in FIG. 17, the additional position adjustment step may include a first fine adjustment step S300 and a second fine adjustment step S400. The first fine adjustment step S300 and the second fine adjustment step S400 correspond to a first fine adjustment step S22 and a second fine adjustment step S23 in Japanese Patent Application Laid-Open No. 2016-191715, respectively. Therefore, for technical matters related to these steps, please refer to the publication. An outline of these steps is described below.

(4-1) First Fine Adjustment Step

Figure 12:
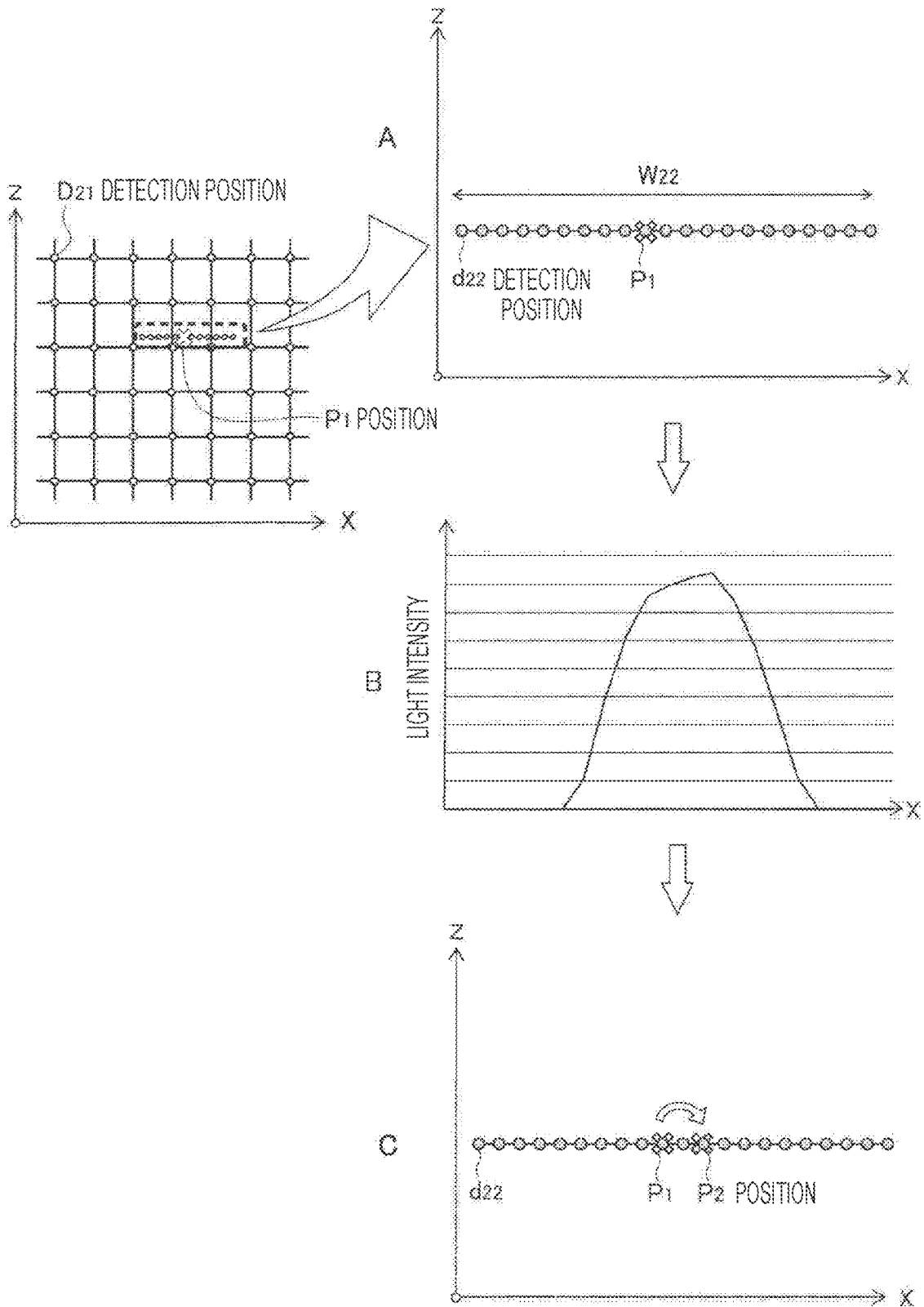
FIG. 12 is a diagram for illustrating a fine adjustment step that may be included in an additional position adjustment step.

FIG. 12 is a diagram for illustrating control at the first fine adjustment step S300. For example, as illustrated in FIG. 17, the first fine adjustment step S300 may include a linear signal acquisition step S301, a one-dimensional distribution parameter estimation step S302, and a maximum position movement step S303. Each step is described.

(4-1-1) Linear Signal Acquisition Step S301

At the linear signal acquisition step S301, fluorescence or scattered light from a plurality of detection positions d22 arranged in the width direction (x-axis direction) of the flow path with the feature position (represented by reference sign P1 in FIG. 12) after the positional relationship adjustment in "(3-3) Adjustment Step" described above as the center is detected (FIG. 12A). A detection interval W22 and the number of arranged detection positions d22 may be appropriately set. FIG. 12A illustrates a case where 19 detection positions d22 are arranged in the x-axis direction with the feature position P1 as the center as an example.

The fluorescence or scattered light may be detected for a certain period of time for one detection position d22. The fluorescence or scattered light detected within a certain period of time is integrated, converted into an electric signal, and output to the control unit 103. The fluorescence or scattered light may be detected by scanning with the laser light in the x-axis direction and the z-axis direction to sequentially irradiate each detection position d22 with the laser light, and detecting the generated fluorescence or scattered light. Alternatively, the fluorescence may be collectively detected by an area imaging element from each detection position d22 by the irradiation with the laser light.

(4-1-2) One-Dimensional Distribution Parameter Estimation Step S302

At the one-dimensional distribution parameter estimation step S302, the control unit 10 assumes that a relationship between each detection position d22 and an integrated value or an average value of detection intensity of the fluorescence follows one-dimensional distribution stored in a memory and the like. For example, in a case where data of the detection intensity as illustrated in FIG. 12B is acquired, the control unit 103 may calculate a maximum value on the basis of the least squares method by making the one-dimensional distribution an Nth-order polynomial model. By making the one-dimensional distribution the Nth-order polynomial model rather than normal distribution, it is possible to accurately cope with variation in distribution of an optical profile due to design variation and the like of each component forming a device that analyzes the microparticle using the flow path.

Furthermore, a value used for estimation at the one-dimensional distribution parameter estimation step S302 is not limited to the above-described integrated value and average value. As the value used for the estimation, for example, a median of the detection intensity or the number of events (especially, the number of microparticles that flow within a certain period of time) may be used.

Here, in a case where the distribution is made the Nth-order polynomial model, the higher the order is, the higher the accuracy is, but on the other hand, when the order is too high, the more likely it is affected by an error in detection intensity of each detection position d22, so that, for example, it is preferable to set to fourth-order.

(4-1-3) Maximum Position Movement Step S303

At the maximum position movement step S303, the control unit 103 outputs, to the control unit 103, a movement signal to a position P2 in which the integrated value or average value of the detection intensity is larger, preferably the maximum value in the one-dimensional distribution assumed at the one-dimensional parameter estimation step S302. Therefore, as illustrated in FIG. 12C, the control unit 103 moves the microparticle sorting microchip 150 so that the feature position P1 moves to the position P2. Note that, although a case where the position P2 illustrated in FIG. 12C is located on the detection position d22 is described as an example, the position P2 may also be located between two detection positions d22.

In this manner, at the first fine adjustment step S300, the position of the flow path after the adjustment step may be further accurately adjusted. Especially, the position adjustment of the microchip 150 is performed on the basis of the detection intensity of the detection positions d22 arranged in one direction. Therefore, the number of data to be detected may be reduced as compared with a case where the position adjustment is performed on the basis of the intensity of the detection positions arranged in a plurality of directions, for example, in a lattice pattern. Therefore, by narrowing the interval between the detection positions d22, even if the number of arrangement is increased and the accuracy of the data is increased, an increase in data detection time may be suppressed as compared with a case of acquiring the data two-dimensionally.

(4-2) Second Fine Adjustment Step

Figure 13:
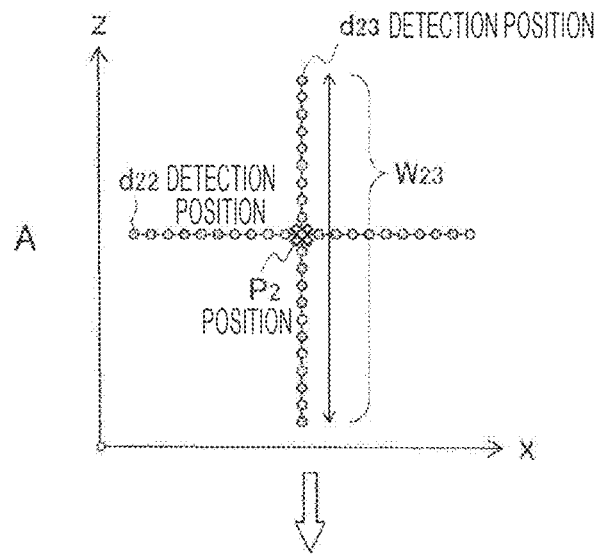
FIG. 13 is a diagram for illustrating a fine adjustment step that may be included in an additional position adjustment step.
Figure 13:
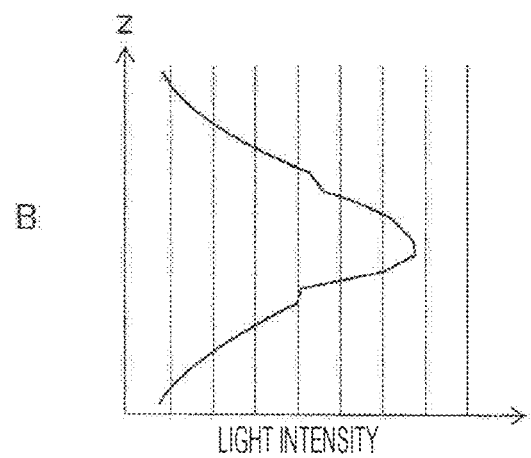
Figure 13:
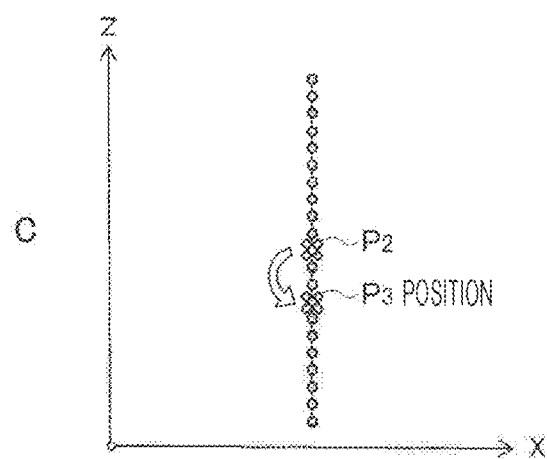

FIG. 13 is a diagram for illustrating control at the second fine adjustment step S400. For example, as illustrated in FIG. 17, the second fine adjustment step S400 includes a linear signal acquisition step S401, a one-dimensional parameter estimation step S402, and a maximum position movement step S403.

As illustrated in FIGS. 13A to 13C, the control at this step S23 is substantially similar to the control at the first fine adjustment step S300 described with reference to FIGS. 12A to 12C except that the feature position P1 is moved in the z-axis direction from the position P2 to a position P3 on the basis of the detection in an intensity of detection positions d23 arranged in the z-axis direction with the position P2 as the center instead of moving the feature position P1 in the x-axis direction from the position P1 to the position P2 on the basis of the detection intensity of the detection positions d22 arranged in the x-axis direction. Therefore, the description thereof is omitted here.

In the above description, the position is adjusted in the x-axis direction (width direction of the flow path) at the first fine adjustment step S300, and then the position is adjusted in the z-axis direction (optical axis direction) at the second fine adjustment step S400. Regarding the additional position adjustment step, the position may be adjusted in the z-axis direction at the first fine adjustment step S300, and then the position may be adjusted in the x-axis direction at the second fine adjustment step S400.

As described above, at the linear signal acquisition step S301 at the first fine adjustment step S300, the fluorescence or scattered light from a plurality of detection positions d22 arranged in the width direction (x-axis direction) of the flow path with the feature position after the adjustment in "(3-3) Adjustment Step" described above as the center is detected. Here, the center may be shifted in the z-axis direction. For example, this may be shifted from a position in the z-direction in which the focus index is maximized to a position in the z-direction at which the signal from the microparticle (for example, a bead and the like) is maximized.

Figure 19:
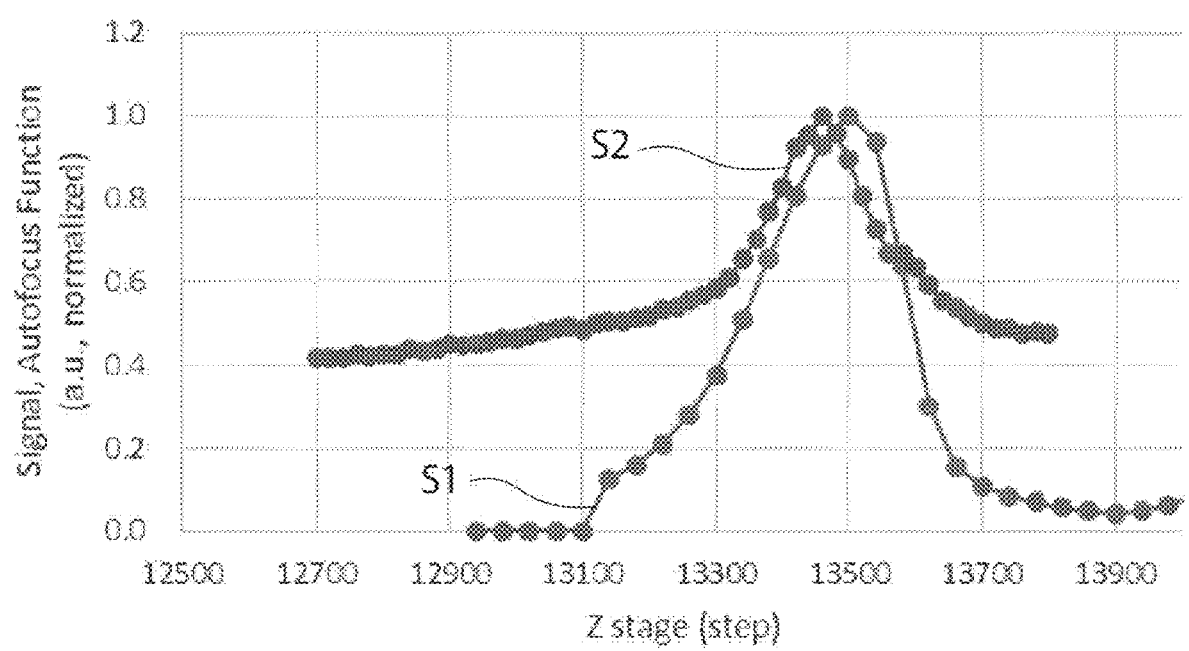
FIG. 19 is a diagram for illustrating an offset between the position in the z-direction in which the focus index is maximized and the center of the flow path.

For example, the position in the z-direction in which the focus index is maximized at the movement step is a position specified on the basis of image information regarding a structure of the flow path such as the wall (for example, a wall surface) or a corner of the flow path. On the other hand, a position in which the microparticle (for example, a cell, a bead or the like) flows in the microparticle sorting operation may be the center of the flow path. Therefore, an offset might occur between the position in the z-direction in which the focus index is maximized and the center of the flow path. For example, as illustrated in FIG. 19, a position in the z-axis direction in which the maximum value is acquired regarding a plot S2 in the z-axis direction of the focus index acquired on the basis of the autofocus function may be different from a position in the z-axis direction in which the maximum value of a plot S1 in the z-axis direction of a signal of light generated by the irradiation of the microparticle with light is acquired. Therefore, it is possible to detect the fluorescence or scattered light from a plurality of detection positions d22 arranged in the x-axis direction with the position shifted in the z-axis direction from the feature position by such a difference as the center as the position adopted as the center at the linear signal acquisition step S301.

By shifting in this manner, the flow path may be moved to a more appropriate position at the first fine adjustment step.

(5) Another Example of Microparticle Analysis Device That Executes Position Adjusting Method of Present Technology The position adjusting method of the present technology may also be executed by a microparticle analysis device (for example, a flow cytometer) that forms a droplet and analyzes and/or sorts a microparticle. For example, a flow path in a flow cell or a microchip used in the device may be the flow path the position of which is adjusted by the position adjusting method of the present technology. Hereinafter, a configuration example of the device is described.

Figure 14:
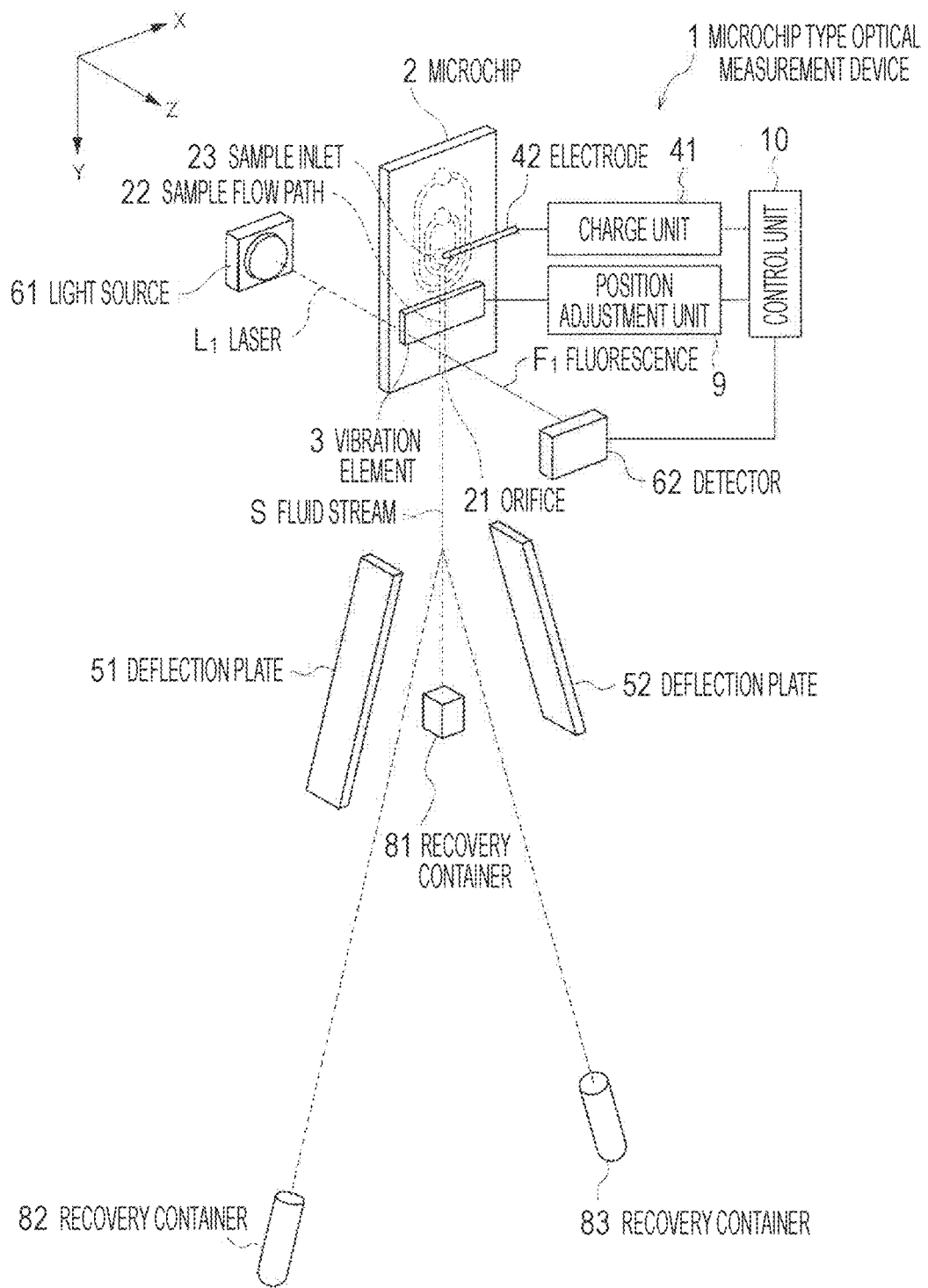
FIG. 14 is a diagram illustrating another configuration example of a microparticle analysis device that executes the position adjusting method of the present technology.
Figure 15:
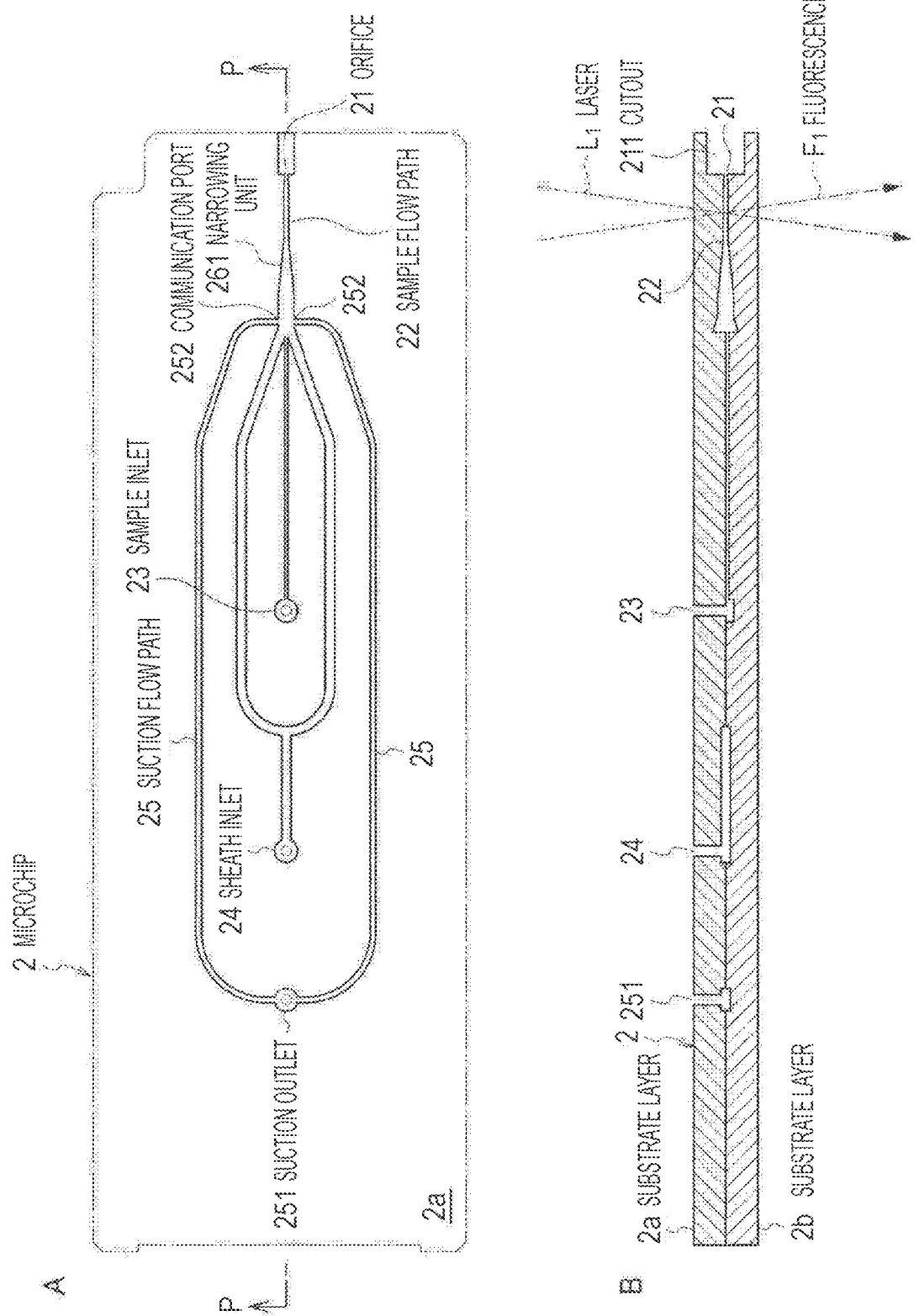
FIG. 15 is a schematic diagram illustrating an example of a microchip attached to the microparticle analysis device that executes the position adjusting method of the present technology.
Figure 16:
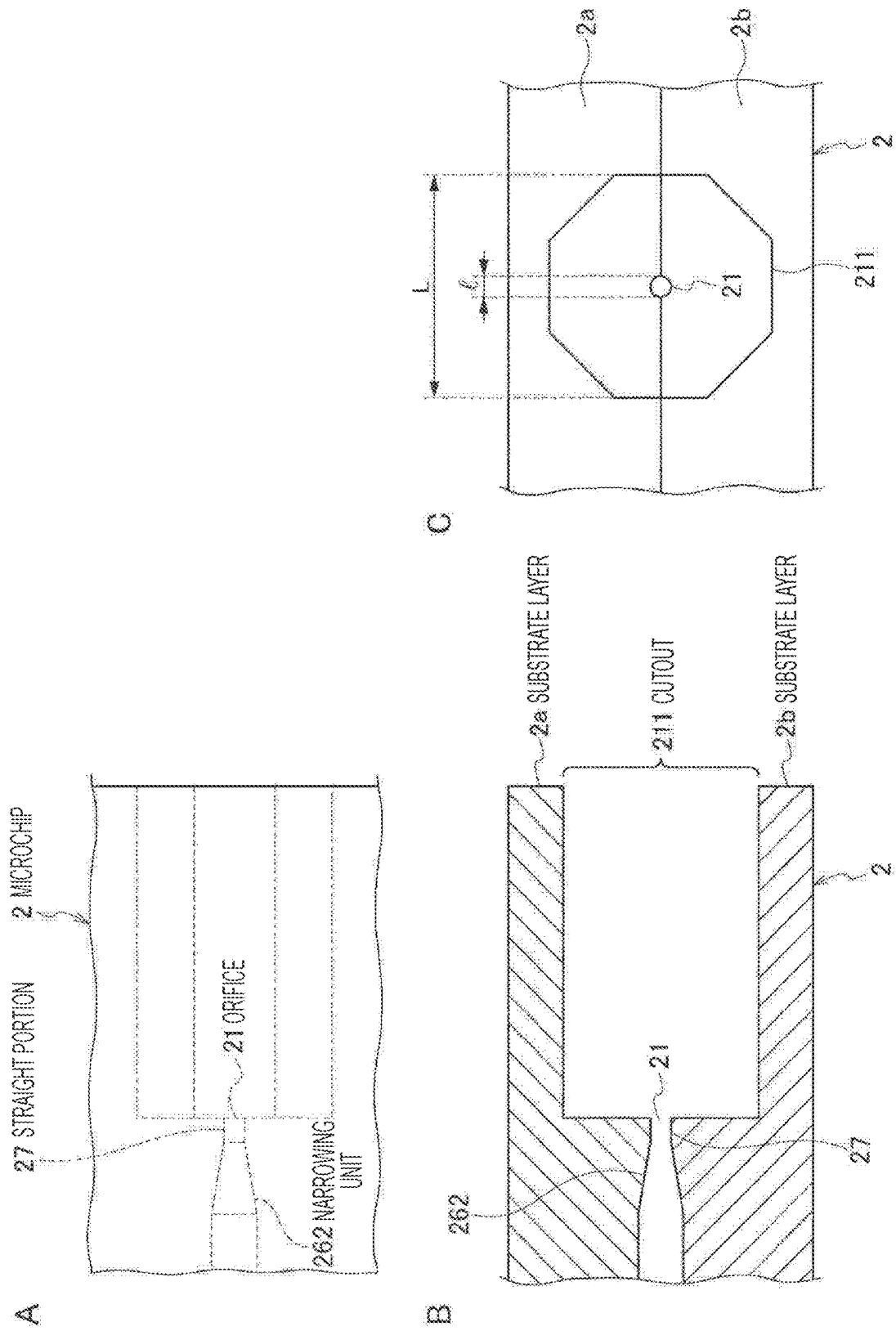
FIG. 16 is a schematic diagram for illustrating a structure of a microchip attached to the microparticle analysis device that executes the position adjusting method of the present technology.

FIG. 14 illustrates a schematic diagram for illustrating a configuration of a microparticle analysis device 1 (hereinafter also referred to as a "flow cytometer 1") that forms a droplet and analyzes and/or sorts a microparticle. Furthermore, FIGS. 15 and 16 illustrate an example of a microchip 2 that may be mounted on the flow cytometer 1. FIG. 15A is a schematic top view, and FIG. 15B is a schematic cross-sectional view corresponding to a P-P cross-section in FIG. 15A. Furthermore, FIG. 16 is a diagram for schematically illustrating a configuration of an orifice 21 of the microchip 2, in which A is a top view, B is a cross-sectional view, and C is a front view. FIG. 16B corresponds to the P-P cross-section in FIG. 15A.

(5-1) Irradiation Detection Unit

The flow cytometer 1 is provided with an irradiation detection unit including a light source 61 that irradiates the microchip 2 with laser L1 and a detector 62 that detects detection target light generated by the irradiation with the laser L1. An irradiation direction of the laser L1 with respect to the microchip 2 (an optical axis of the laser L1) is indicated by a Z-axis positive direction in FIG. 1. The light source 61 may be an LD, an LED and the like.

A cell that flows through a sample flow path 22 of the microchip 2 is irradiated with the laser L1. The detector 62 detects scattered light of the laser L1 by the cell and fluorescence generated when the cell or fluorescent dye with which the cell is labeled is excited by the laser L1. In FIG.

14, the fluorescence generated from the cell that flows through the sample flow path 22 is represented by a reference sign F1.

The irradiation detection unit includes an irradiation system including a condensing lens for guiding and condensing the laser L1 emitted from the light source 61 on the cell, a dichroic mirror, a bandpass filter and the like. Furthermore, the irradiation detection unit includes a detection system that condenses detection target light generated from the cell by the irradiation with the laser L1 and guides the same to the detector 62. The detection system includes, for example, a photo multiplier tube (PMT), an area imaging element such as a CCD and a CMOS element and the like.

The detection target light detected by the detection system of the irradiation detection unit is light generated from the cell by the irradiation with the laser L1, and may be, for example, forward scattered light, side scattered light, scattered light of Rayleigh scattering, Mie scattering and the like, fluorescence and the like. The fluorescence may be generated from the cell or the fluorescent dye with which the cell is labeled. The detection target light is converted into an electric signal and used for optical characteristic determination of the cell and automatic adjustment of an optical position described later.

(5-2) Position Adjustment Unit

The flow cytometer 1 is provided with a position adjustment unit 9 that changes a relative position of the microchip 2 with respect to the irradiation detection unit. The position adjustment unit 9 moves the position of the microchip 2 and/or the position of the irradiation detection unit on a plane (XY plane) perpendicular to the optical axis of the laser L1. Therefore, the position adjustment unit 9 adjusts the position of the microchip 2 with respect to the optical axis of the laser L1, and optimizes so that a flow position of the cell in the sample flow path 22 is irradiated with the laser L1.

It is only required that the position adjustment unit 9 may move at least one of the position of the microchip 2 or the position of the irradiation detection unit including the light source 61 and the detector 62 in an X-axis direction and a Y-axis direction. The position adjustment unit 9 includes, for example, a stepping motor and the like. Note that, the position adjustment unit 9 may also move the relative position of the microchip 2 with respect to the irradiation detection unit in a Z-axis direction (focal direction of the laser L1).

(5-3) Vibration Element

The flow cytometer 1 is provided with a vibration element 3 that applies vibration to the orifice 21 formed on the microchip 2 and makes a droplet of a laminar flow of a sample liquid including cells and a sheath liquid discharged from the orifice 21 to discharge. The vibration element 3 may be, for example, a piezo element. The discharged droplets become a fluid stream S and ejected in a Y-axis positive direction indicated by an arrow in the drawing. Note that, in the flow cytometer 1, the microchip 2 is mounted in a replaceable manner.

In the flow cytometer 1, the vibration element 3 may be formed integrally with the microchip 2, or may be arranged on a device side so as to be contactable with the mounted microchip 2.

(5-4) Charge Unit

A positive or negative charge is applied to the droplet discharged from the orifice 21 by the charge unit 41. The droplet is charged by an electrode 42 electrically connected to the charge unit 41 and inserted into a sample inlet 23 provided on the microchip 2. Note that, it is sufficient that the electrode 42 is inserted in any position of the microchip 2 so as to be in electrical contact with the sample liquid or the sheath liquid delivered through the flow path.

In the flow cytometer 1, by synchronizing a frequency of a drive voltage of the vibration element 3 with a switching timing of a voltage (charge voltage) of the charge unit 41, either positive or negative charge is applied to a part of the droplets discharged from the orifice 21. It is possible that a part of droplets is not applied with the charge and is not charged.

(5-5) Deflection Plate

Moreover, the flow cytometer 1 is provided with a pair of deflection plates 51 and 52 arranged so as to face each other across the fluid stream S. The deflection plates 51 and 52 change a travel direction of each droplet in the fluid stream S by an electrical force acting between the same and the charge applied to the droplet. The deflection plates 51 and 52 may be electrodes used in general. In FIG. 14, a facing direction of the deflection plates 51 and 52 is indicated by the X-axis direction.

(5-6) Recovery Container

The fluid stream that passes between the deflection plates 51 and 52 is received by any of a recovery container 81, a recovery container 82, or a recovery container 83. For example, in a case where the deflection plate 51 is positively charged and the deflection plate 52 is negatively charged, the droplet negatively charged by the charge unit 41 is recovered in the recovery container 82, and the positively charged droplet is recovered in the recovery container 83. Furthermore, the droplet that is not charged by the charge unit 41 flies straight without receiving an electrical action force from the deflection plates 51 and 52 and recovered in the recovery container 81. In the flow cytometer 1, by controlling the travel direction of the droplet according to the characteristic of the microparticle (for example, a biological particle, especially, a cell) included in each droplet, a target microparticle having a desired characteristic and a non-target microparticle other than the same may be recovered in separate recovery containers.

The recovery containers 81, 82, and 83 may be general-purpose plastic tubes or glass tubes for experiment. It is preferable that these recovery containers are arranged in the flow cytometer 1 so as to be exchangeable. Furthermore, a drainage passage of the recovered droplet may be connected to the recovery container that receives the non-target microparticle out of the recovery containers. Note that, in the flow cytometer 1, the number of recovery containers to be arranged is not especially limited. In a case where more than three recovery containers are arranged, each droplet is guided to any one of the recovery containers depending on the presence or absence of the electrical acting force between the same and the deflection plates 51 and 52 and magnitude thereof to be recovered.

(5-7) Control Unit and the Like

In addition to the above-described configuration, the flow cytometer 1 is provided with, for example, a data analysis unit for determining an optical characteristic of a cell, a tank for storing the sample liquid and sheath liquid, and a control unit 10 for controlling each of these configurations provided in a normal flow cytometer. The control unit 10 includes the movement control unit 108 and the positional relationship adjustment unit 109 described in (3) described above.

The control unit 10 may include a general-purpose computer provided with a CPU, a memory, a hard disk and the like. In the control unit 10, a hard disk may store, in addition to an OS, a program for allowing the flow cytometer 1 to execute the position adjusting method of the present technology, a program for allowing the flow cytometer 1 to execute the microparticle analysis operation performed after the position adjusting method of the present technology and the like. It is also possible that the program is not stored in the hard disk provided in the flow cytometer 1, and in this case, this may be recorded on a recording medium such as a microSD memory card, an SD memory card, or a flash memory, for example. The control unit 10 may allow the flow cytometer 1 to execute the position adjusting method of the present technology according to the program.

The control unit 10 may output, to the position adjustment unit 9, a movement signal to a position in which the integrated value or average value of the detection intensity of the light generated from the microchip by the irradiation with the laser L1 becomes larger (preferably becomes the maximum), the position in which variation is reduced in an area set in advance.

(5-8) Microchip

The microchip 2 is obtained by bonding substrate layers 2a and 2b on which the sample flow path 22 is formed. The sample flow path 22 may be formed on the substrate layers 2a and 2b by injection molding of a thermoplastic resin using a mold. As the thermoplastic resin, plastics known as materials of conventional microchips such as polycarbonate, polymethyl methacrylate resin (PMMA), cyclic polyolefin, polyethylene, polystyrene, polypropylene, and polydimethylsiloxane (PDMS) may be employed.

The sample liquid is introduced into the sample inlet 23, joins the sheath liquid introduced into a sheath inlet 24, and is delivered through the sample flow path 22. The sheath liquid introduced from the sheath inlet 24 is separately delivered in two directions, and thereafter joins the sample liquid so as to sandwich the sample liquid from the two directions at a junction with the sample liquid introduced from the sample inlet 23. Therefore, a three-dimensional laminar flow in which a sample liquid laminar flow is located at the center of a sheath liquid laminar flow is formed at the junction.

A reference sign 25 represents a suction flow path for applying a negative pressure in the sample flow path 22 to temporarily reverse the flow to eliminate clogging and bubbles when the clogging or bubbles occur in the sample flow path 22. A suction outlet 251 connected to a negative pressure source such as a vacuum pump is formed at one end of the suction flow path 25, and the other end is connected to the sample flow path 22 at a communication port 252.

A laminar flow width of the three-dimensional laminar flow is narrowed at narrowing units 261 (refer to FIG. 15) and 262 (refer to FIG. 16) formed so that an area of a cross-section perpendicular to a liquid delivery direction decreases gradually and stepwise from an upstream to a downstream in the liquid delivery direction. Thereafter, the three-dimensional laminar flow is discharged from the orifice 21 provided at one end of the flow path.

A cell characteristic is detected between the narrowing unit 261 and the narrowing unit 262 of the sample flow path 22. The irradiation detection unit irradiates the cells delivered in a line at the center of the three-dimensional laminar flow in the sample flow path 22 with the laser L1, and detects fluorescence F1 and scattered light generated from the cell (refer to FIG. 15).

The position adjusting method of the present technology may be performed on the flow path between the narrowing unit 261 and the narrowing unit 262 in the sample flow path 22.

A connection to the orifice 21 of the sample flow path 22 is a straight portion 27 formed in a linear shape. The straight portion 27 serves to eject the fluid stream S straight in the Y-axis positive direction from the orifice 21.

The three-dimensional laminar flow discharged from the orifice 21 is formed into droplets by vibration applied to the orifice 21 by the vibration element 31, and is ejected as the fluid stream S (refer to FIG. 14). The orifice 21 is opened in an end face direction of the substrate layers 2a and 2b, and a cutout 211 is provided between an opening position and end faces of the substrate layers. The cutout 211 is formed by cutting out the substrate layers 2a and 2b between the opening position of the orifice 21 and the substrate end faces so that a diameter L of the cutout 221 is larger than an opening diameter 1 of the orifice 21 (refer to FIG. 16C). The diameter L of the cutout 211 is desirably formed to be not smaller than twice as large as the opening diameter 1 of the orifice 21 so as not to hinder the movement of the droplet discharged from the orifice 21.

(5-9) Imaging Optical System

The microparticle analysis device 1 includes an imaging optical system (not illustrated) that images a flow path between the narrowing unit 261 and the narrowing unit 262 in the sample flow path 22. The imaging optical system may include the illumination device 370 and the imaging element 371 as described in "(2-4) Configuration Example of Optical System" described above. The description in "(2-4) Configuration Example of Optical System" described above also applies to the imaging optical system included in the microparticle analysis device 1.

2. Second Embodiment (Microparticle Analysis Device)

The present technology also provides a microparticle analysis device provided with an imaging optical system that images, while moving a flow path through which a microparticle is able to flow in an optical axis direction, the flow path in a plurality of positions in the optical axis direction, a movement control unit that moves the flow path in the optical axis direction on the basis of a focus index for each of a plurality of images acquired by the imaging optical system, and a positional relationship adjustment unit that adjusts a positional relationship between a feature position specified from an image of the flow path in a position after movement and a reference position in a direction perpendicular to the optical axis direction.

The microparticle analysis device of the present technology may execute the position adjusting method described in "1. First Embodiment (Position Adjusting Method)" described above by including the imaging optical system, the movement control unit, and the positional relationship adjustment unit. Therefore, in the microparticle analysis device of the present technology, it is possible to reduce the number of microparticles used for adjusting the position of the flow path irradiated with light for microparticle analysis.

The microparticle analysis device of the present technology may have the configuration as described in "1. First Embodiment (Position Adjusting Method)" described above, for example, and the description also applies to this embodiment.

3. Third Embodiment (Program)

The present technology also provides a program for allowing a microparticle analysis device to execute a position adjusting method of the present technology. The position adjusting method is as described in "1. First Embodiment (Position Adjusting Method)" described above.

The program may be implemented by the microparticle analysis device 100, especially, by the control unit 103 described in "1. First Embodiment (Position Adjusting Method)" described above, for example.

Furthermore, the program may be implemented by the microparticle analysis device 1, especially, by the control unit 10 described in "1. First Embodiment (Position Adjusting Method)" described above, for example.

Note that, the present technology may also have following configurations.

[1] A position adjusting method provided with:
   an imaging step of imaging, while moving a flow path through which a microparticle is able to flow in an optical axis direction, the flow path in a plurality of positions in the optical axis direction;
   a movement step of moving the flow path in the optical axis direction on the basis of a focus index for each of a plurality of images acquired at the imaging step; and
   an adjustment step of specifying a feature position of the flow path from an image of the flow path in a position after movement at the movement step, and adjusting a positional relationship between the feature position and a reference position in a direction perpendicular to the optical axis direction.

[2] The position adjusting method according to [1], in which
   the focus index is an index indicating whether or not the flow path is focused.

[3] The position adjusting method according to [1] or [2], in which
   the focus index is a focus index acquired by using an autofocus function.

[4] The position adjusting method according to [3], in which
   the autofocus function is a function based on an image difference.

[5] The position adjusting method according to [3] or [4], in which
   the autofocus function is a Brenner function.

[6] The position adjusting method according to any one of [1] to [5], in which
   the flow path is used for irradiating a microparticle that flows through the flow path with laser light and analyzing the microparticle on the basis of light generated by the irradiation.

[7] The position adjusting method according to [6], in which
   a direction of an optical axis of the laser light is substantially the same as the optical axis direction at the imaging step.

[8] The position adjusting method according to any one of [1] to [7], in which
   the movement step includes an image specification step of specifying an image that provides a focus index satisfying a predetermined standard from the plurality of acquired focus indexes, and
   at the movement step, the flow path is moved to a position in which the image specified at the image specification step is imaged.

[9] The position adjusting method according to any one of [1] to [8], in which
   the movement step includes an image specification step of specifying an image that provides a maximum or minimum focus index from the plurality of acquired focus indexes, and
   at the movement step, the flow path is moved to a position in which the image specified at the image specification step is imaged.

[10] The position adjusting method according to any one of [1] to [9], in which
   the feature position is specified on the basis of a position of a wall that defines the flow path.

[11] The position adjusting method according to any one of [1] to [10], in which
   the feature position is a substantially central position in a width direction of the flow path.

[12] The position adjusting method according to any one of [1] to [11], in which
   the reference position is an optical axis passing position of laser light with which a microparticle that flows through the flow path is irradiated.

[13] The position adjusting method according to any one of [1] to [12], in which
   the positional relationship is a positional relationship in a width direction of the flow path.

[14] The position adjusting method according to any one of [1] to [13], in which
   at the adjustment step, the flow path is moved in a width direction of the flow path.

[15] The position adjusting method according to any one of [1] to [14], in which
   the flow path is used for irradiating a microparticle that flows through the flow path with laser light and analyzing the microparticle on the basis of light generated by the irradiation, and
   at the adjustment step, an irradiation position of the laser light is adjusted.

[16] The position adjusting method according to any one of [1] to [15], further provided with:
   an additional position adjustment step of irradiating a microparticle that flows through the flow path with laser light and further adjusting the position of the flow path on the basis of light generated by the irradiation.

[17] The position adjusting method according to any one of [1] to [16], in which
   the microparticle is a biological particle.

[18] A microparticle analysis device provided with:
   an imaging optical system that images, while moving a flow path through which a microparticle is able to flow in an optical axis direction, the flow path in a plurality of positions in the optical axis direction;
   a movement control unit that moves the flow path in the optical axis direction on the basis of a focus index for each of a plurality of images acquired by the imaging optical system; and
   a positional relationship adjustment unit that adjusts a positional relationship between a feature position specified from an image of the flow path in a position after movement and a reference position in a direction perpendicular to the optical axis direction.

[19] The microparticle analysis device according to [18], further provided with:
   an irradiation optical system that irradiates a microparticle that flows through the flow path with laser light; and
   a light detection system that detects light generated by irradiation of the laser light, in which
   a direction of an optical axis of the laser light is substantially the same as the optical axis direction of the imaging optical system.

[20] The microparticle analysis device according to [18] or [19], further provided with:

an irradiation optical system that irradiates a microparticle that flows through the flow path with laser light; and a light detection system that detects light generated by irradiation of the laser light, in which any one of or both the irradiation optical system and the light detection system share at least one of optical components included in the imaging optical system.

[21] A program for allowing a microparticle analysis device to execute:

an imaging step of imaging, while moving a flow path through which a microparticle is able to flow in an optical axis direction, the flow path in a plurality of positions in the optical axis direction;

a movement step of moving the flow path in the optical axis direction on the basis of a focus index for each of a plurality of images acquired at the imaging step; and an adjustment step of specifying a feature position of the flow path from an image of the flow path in a position after movement at the movement step, and adjusting a positional relationship between the feature position and a reference position in a direction perpendicular to the optical axis direction.

REFERENCE SIGNS LIST

100 Microparticle analysis device
103 Control unit
108 Movement control unit
109 Positional relationship adjustment unit
150 Microparticle sorting microchip

The invention claimed is:

1. A position adjusting method comprising:
an imaging step of imaging, while moving a flow path through which a microparticle is able to flow in an optical axis direction, the flow path in a plurality of positions in the optical axis direction;
a movement step of moving the flow path in the optical axis direction on a basis of a focus index for each of a plurality of images acquired at the imaging step;
an illumination step of illuminating the flow path with a first laser light source at a wavelength range between 550 nm to 800 nm, a second laser light source at a wavelength range between 450 nm to 550 nm, and a third laser light source at a wavelength range between 380 nm to 450 nm
using a plurality of mirrors to redirect a condensed beam of the first laser light source and the second laser light source and the third laser light source at angles into additional detectors and sensors;
using a diffusion plate that diffuses the condensed beam of the first laser light source and the second laser light source and the third laser light source, the diffusion plate being located in between a mirror and an objective lens; and
an adjustment step of specifying a feature position of the flow path from an image of the flow path in a position after movement at the movement step, and adjusting a positional relationship between the feature position and a reference position in a direction perpendicular to the optical axis direction.

2. The position adjusting method according to claim 1, wherein
the focus index is an index indicating whether or not the flow path is focused.

3. The position adjusting method according to claim 1, wherein the focus index is a focus index acquired by using an autofocus function.

4. The position adjusting method according to claim 3, wherein
the autofocus function is a function based on an image difference.

5. The position adjusting method according to claim 3, wherein
the autofocus function is a Brenner function.

6. The position adjusting method according to claim 1, wherein
the flow path is used for irradiating a microparticle that flows through the flow path with laser light and analyzing the microparticle on a basis of light generated by the irradiation.

7. The position adjusting method according to claim 6, wherein
a direction of an optical axis of the laser light is substantially same as the optical axis direction at the imaging step.

8. The position adjusting method according to claim 1, wherein
the movement step includes an image specification step of specifying an image that provides a focus index satisfying a predetermined standard from the plurality of acquired focus indexes, and
at the movement step, the flow path is moved to a position in which the image specified at the image specification step is imaged.

9. The position adjusting method according to claim 1, wherein
the movement step includes an image specification step of specifying an image that provides a maximum or minimum focus index from the plurality of acquired focus indexes, and
at the movement step, the flow path is moved to a position in which the image specified at the image specification step is imaged.

10. The position adjusting method according to claim 1, wherein
the feature position is specified on a basis of a position of a wall that defines the flow path.

11. The position adjusting method according to claim 1, wherein
the feature position is a substantially central position in a width direction of the flow path.

12. The position adjusting method according to claim 1, wherein
the reference position is an optical axis passing position of laser light with which a microparticle that flows through the flow path is irradiated.

13. The position adjusting method according to claim 1, wherein
the positional relationship is a positional relationship in a width direction of the flow path.

14. The position adjusting method according to claim 1, wherein,
at the adjustment step, the flow path is moved in a width direction of the flow path.

15. The position adjusting method according to claim 1, wherein
the flow path is used for irradiating a microparticle that flows through the flow path with laser light and analyzing the microparticle on a basis of light generated by the irradiation, and
at the adjustment step, an irradiation position of the laser light is adjusted.

16. The position adjusting method according to claim 1, further comprising:
- an additional position adjustment step of irradiating a microparticle that flows through the flow path with laser light and further adjusting the position of the flow path on a basis of light generated by the irradiation.

17. The position adjusting method according to claim 1, wherein
the microparticle is a biological particle.

18. A non-transitory computer readable storage medium containing program instructions for allowing a microparticle analysis device to execute:
- an imaging step of imaging, while moving a flow path through which a microparticle is able to flow in an optical axis direction, the flow path in a plurality of positions in the optical axis direction;
- a movement step of moving the flow path in the optical axis direction on a basis of a focus index for each of a plurality of images acquired at the imaging step;
- an illumination step of illuminating the flow path with a first laser light source at a wavelength range between 550 nm to 800 nm, a second laser light source at a wavelength range between 450 nm to 550 nm, and a third laser light source at a wavelength range between 380 nm to 450 nm
- using a plurality of mirrors to redirect a condensed beam of the first laser light source and the second laser light source and the third laser light source at angles into additional detectors and sensors;
- using a diffusion plate that diffuses the condensed beam of the first laser light source and the second laser light source and the third laser light source, the diffusion plate being located in between a mirror and an objective lens; and
- an adjustment step of specifying a feature position of the flow path from an image of the flow path in a position after movement at the movement step, and adjusting a positional relationship between the feature position and a reference position in a direction perpendicular to the optical axis direction.

* * * * *